United States Patent
Jiang et al.

(10) Patent No.: US 12,540,943 B2
(45) Date of Patent: Feb. 3, 2026

(54) USE OF ACYL COENZYME A: CHOLESTEROL ACYLTRANSFERASE-1 IN DIAGNOSIS AND TREATMENT OF LIVER CANCER

(71) Applicants: ACADEMY OF MILITARY MEDICAL SCIENCES, Beijing (CN); BEIJING PROTEOME RESEARCH CENTER, Beijing (CN)

(72) Inventors: Ying Jiang, Beijing (CN); Aihua Sun, Beijing (CN); Fuchu He, Beijing (CN); Chaoying Li, Beijing (CN); Jinan Zhou, Beijing (CN); Handong Wei, Beijing (CN)

(73) Assignees: Academy of Military Medical Sciences, Beijing (CN); Beijing Proteome Research Center, Beijing (CN)

( * ) Notice: Subject to any disclaimer, the term of this patent is extended or adjusted under 35 U.S.C. 154(b) by 1279 days.

(21) Appl. No.: 17/299,024

(22) PCT Filed: Dec. 4, 2018

(86) PCT No.: PCT/CN2018/119121
§ 371 (c)(1),
(2) Date: Jun. 2, 2021

(87) PCT Pub. No.: WO2020/113409
PCT Pub. Date: Jun. 11, 2020

(65) Prior Publication Data
US 2022/0034891 A1 Feb. 3, 2022

(51) Int. Cl.
*C12Q 1/6886* (2018.01)
*G01N 33/574* (2006.01)

(52) U.S. Cl.
CPC ..... *G01N 33/57438* (2013.01); *C12Q 1/6886* (2013.01); *C12Q 2600/118* (2013.01); *C12Q 2600/158* (2013.01); *G01N 2333/91057* (2013.01)

(58) Field of Classification Search
None
See application file for complete search history.

(56) References Cited

U.S. PATENT DOCUMENTS

2015/0147761 A1* 5/2015 Meyer ............. G01N 33/57438
435/7.1

FOREIGN PATENT DOCUMENTS

| CN | 106955353 A | 7/2017 | |
|---|---|---|---|
| CN | 106955354 A | 7/2017 | |
| CN | 106957893 A | 7/2017 | |
| CN | 107641647 A | 1/2018 | |
| CN | 109125324 A | 1/2019 | |
| WO | 2009067397 A1 | 5/2009 | |
| WO | WO-2017121318 A1 * | 7/2017 | ........... A61K 31/145 |

OTHER PUBLICATIONS

NCBI Reference Sequence: NG_030638.1 (Year: 2011).*
Na, K., Jeong, S. K., Lee, M. J., Cho, S. Y., Kim, S. A., Lee, M. J., . . . & Paik, Y. K. Human liver carboxylesterase 1 outperforms alpha-fetoprotein as biomarker to discriminate hepatocellular carcinoma from other liver diseases in Korean patients. International journal of cancer, 133(2), 408-415. (Year: 2013).*
Mok SR, Mohan S, Grewal N, Elfant AB, Judge Ta. A genetic database can be utilized to identify potential biomarkers for biphenotypic hepatocellular carcinoma-cholangiocarcinoma. J Gastrointest Oncol. Aug. 2016;7(4):570-9. (Year: 2016).*
Bemlih, Sana et al.; Acyl-coenzyme A: Cholesterol acyltransferase inhibitor Avasimibe affect survival and proliferation of glioma tumor cell lines; Cancer Biology & Therapy, vol. 9, No. 12, Jun. 15, 2010, ISSN: 1555-8576; pp. 1025-1032.
International Search Report issued in corresponding International Application No. PCT/CN2018/119121; mailed Sep. 3, 2019; China National Intellectual Administration, Beijing, China, 12 pgs.

* cited by examiner

*Primary Examiner* — Neil P Hammell
*Assistant Examiner* — Khaleda B Hasan
(74) *Attorney, Agent, or Firm* — HAUPTMAN HAM, LLP

(57) ABSTRACT

A use of a substance for inhibiting SOAT1 gene expression and/or protein activity. The use is selected from at least one of: (a) Preparation of kits for liver cancer diagnosis; (b) Preparation of kits for liver cancer prognosis; (c) Preparation of companion diagnostic kits for treatment of liver cancer; (d) For the preparation of drugs for the prevention and/or treatment of cancer; (e) For the preparation of drugs for the prevention and/treatment of cancer spread and metastasis; (f) For the preparation of drugs that promote the apoptosis of cancer cells; (g) For the preparation of drugs for inhibiting cancer cell formation; (h) For the preparation of drugs that inhibit the proliferation and growth of cancer cells in vitro. Experiments have shown that SOAT1 is highly expressed in liver cancer tissues and serum, and its high abundance indicates poor prognosis of liver cancer patients.

18 Claims, 10 Drawing Sheets
Specification includes a Sequence Listing.

```
                      SEQUENCE LISTING

<160> NUMBER OF SEQ ID NOS: 1

<210> SEQ ID NO 1
<211> LENGTH: 59
<212> TYPE: DNA
<213> ORGANISM: Artificial sequence
<220> FEATURE:
<223> OTHER INFORMATION: Synthesized

<400> SEQUENCE: 1
ccggtggtcc atgactggct atattctcga gaatatagcc agtcatggac catttttg      59
```

USE OF ACYL COENZYME A: CHOLESTEROL ACYLTRANSFERASE-1 IN DIAGNOSIS AND TREATMENT OF LIVER CANCER

RELATED APPLICATIONS

The present application is a U.S National Phase of International Application Number PCT/CN2018/119121 filed Dec. 4, 2018.

INCORPORATION BY REFERENCE

The sequence listing provided in the file entitled C6351_040_Sequence_Listing, which is an ASCII text file that was created on May 27, 2021 and which comprises 429 bytes, is hereby incorporated by reference in its entirety.

TECHNICAL FIELD

The invention belongs to the field of biomedicine and relates to the application of Acyl coenzyme A: cholesterol acyltransferase-1 in diagnosis and treatment of liver cancer.

BACKGROUND

Hepatocellular carcinoma (HCC) is one of the malignant tumors in the world. It has a higher morbidity and mortality, and its morbidity tends to increase. Every year, 55% of new and dead liver cancer patients worldwide occur in China. The burden of liver cancer is heavy, and the 5-year survival rate is only about 10%. The occurrence of hepatocellular carcinoma is a multi-factor, multi-stage, and complex process. Chronic hepatitis B virus (HBV) infection is an important high-risk factor. Tumor suppression, liver resection, and transplantation are the main treatments for liver cancer at this stage, but about 60% to 100% of patients will relapse after surgery. Even for small liver cancers smaller than 3 cm, some patients can survive for up to 10 or 20 years, while some die within a year and recur within a few months. Therefore, screening early liver cancer patients in high-risk populations, especially liver cirrhosis (LC) patients, and screening patients with higher malignancy among early patients, taking timely treatment measures can improve the survival rate and quality of life of liver cancer patients.

At present, the clinically commonly used diagnostic marker for liver cancer is alpha-fetoprotein (AFP). However, the sensitivity and specificity of AFP in diagnosing liver cancer are not very satisfactory. Sorafenib is currently a targeted drug widely used in the treatment of liver cancer, but it can only effectively prolong the survival period of patients for 3 months. The diagnosis and treatment methods are very limited. Therefore, it is very important to find the markers for the early diagnosis of liver cancer and to guide effective targeted therapy on this basis for the effective treatment of liver cancer.

Acyl-CoA: Cholesterol acyltransferase-1 (SOAT1) is an enzyme that catalyzes the formation of cholesterol esters from free cholesterol and long-chain fatty acids in cells. It exists in all tissues and cells in the human body. The synthesized cholesterol ester enters the intracellular lipid droplet for storage to maintain the lipid metabolism balance of cholesterol and fatty acid in the cell. Cholesterol is an important component in cell lipid metabolism. It has important functions such as regulating the signal transmission on the surface of the cell membrane, composing lipid raft and other related functional areas, and influencing the fluidity of the cell membrane.

SUMMARY OF THE INVENTION

The purpose of the present invention is to provide a system for detecting the protein content or activity of acyl-CoA: cholesterol acyltransferase-1 (SOAT1), and the new use of the system for detecting the content or expression of SOAT1 gene.

The application of system for detecting the protein content or activity of acyl-CoA: cholesterol acyltransferase-1 (SOAT1), and the new use of the system for detecting the content or expression of SOAT1 gene provided by the present invention in at least one of the following aspects: 1) Preparation of products for screening or auxiliary diagnosis of cancer; 2) Preparation of products for predicting the prognosis of cancer; 3) Preparation of companion diagnostic products for cancer treatment.

The present invention also protects the application of the system for detecting the protein content or activity of acyl-CoA: cholesterol acyltransferase-1 (SOAT1) and the system for detecting the content or activity of alpha-fetoprotein in at least one of the following aspects: 1) Preparation of products for screening or auxiliary diagnosis of cancer; 2) Preparation of products for predicting the prognosis of cancer; 3) Preparation of companion diagnostic products for cancer treatment.

The present invention also protects the application of the system for detecting the content or expression of acyl-CoA: cholesterol acyltransferase-1 (SOAT1) gene and the system for detecting the content or expression of alpha-fetoprotein gene in at least one of the following aspects: 1) Preparation of products for screening or auxiliary diagnosis of cancer; 2) Preparation of products for predicting the prognosis of cancer; 3) Preparation of companion diagnostic products for cancer treatment.

In the above application, said system for detecting the protein content or activity of acyl-CoA: cholesterol acyltransferase-1 (SOAT1) includes reagents and/or instruments needed to detect the content or activity of acyl-CoA: cholesterol acyltransferase-1 (S OAT 1) protein.

Said system for detecting the content or expression of acyl-CoA: cholesterol acyltransferase-1 (SOAT1) gene includes reagents and/or instruments needed to detect the content or expression of acyl-CoA: cholesterol acyltransferase-1 (SOAT1) gene.

Said reagents needed to detect the content or expression of acyl-CoA: cholesterol acyltransferase-1 (SOAT1) gene includes: primers that specifically amplify acyl-CoA: cholesterol acyltransferase-1 (SOAT1), or an antibody that specifically detects acyl-CoA: cholesterol acyltransferase-1 (SOAT1).

In the above application, the system for detecting the content or activity of alpha-fetoprotein includes reagents and instruments required for detecting the content or activity of alpha-fetoprotein.

In an embodiment of the present invention, the reagent required for detecting the content of alpha-fetoprotein in serum or plasma is an AFP chemiluminescence kit, and the instrument is a Roche automatic electrochemiluminescence-luminescence immunoassay analyzer.

In the above application, the sample used in the detection is blood (such as blood, serum, plasma) or tissue (such as liver tissue) of a healthy person or a liver cirrhosis (LC) patient or a liver cancer patient.

When blood is used as the test sample, enzyme-linked immunosorbent assay (ELISA) can usually be used to detect the concentration of SOAT1 in the blood.

When tissue is used as a test sample, immune-histochemical test can usually be used to detect the expression of SOAT1 in the tissue.

In the above application, the product may be a system, and the system may include reagents and/or instruments. The reagents include chips, preparations, kits or nucleic acid film strip. The kit can be a fluorescent quantitative PCR kit, or an ELISA kit, or an immunohistochemistry kit or others.

The present invention also protects a product.

The product has at least one of the following uses: 1) Screening or auxiliary diagnosis of cancer; 2) Predicting the prognosis of cancer; 3) Companion diagnosis of cancer treatment.

The product provided by the present invention includes the above-mentioned system for detecting the protein content or activity of acyl-CoA: cholesterol acyltransferase-1 (SOAT1), or the system for detecting the content or expression of acyl-CoA: cholesterol acyltransferase-1 (SOAT1) gene.

Among them, the sample to be tested includes (but is not limited to) blood, serum, plasma, and tissue biopsy.

In this embodiment, the substance used to detect the concentration of SOAT1 protein is SOAT1 protein antibody, specifically, the SOAT1 antibody used in immunohistochemistry and western blotting (Merck Millipore company, article number: ABN66), or SOAT1 kit for ELISA (Mybiosource company, article number: MBS9304160). Of course, it can also be other types of antibodies or other substances that can be used to detect the concentration of SOAT1 protein.

The present invention also protects another product.

The product also has at least one of the following uses: 1) Screening or auxiliary diagnosis of cancer; 2) Predicting the prognosis of cancer; 3) Companion diagnosis of cancer treatment.

The products provided by the present invention include above-mentioned system for detecting the protein content or activity of acyl-CoA: cholesterol acyltransferase-1 (SOAT1) and the system for detecting the content or expression of alpha-fetoprotein;

Or, the system for detecting the content or expression of acyl-CoA: cholesterol acyltransferase-1 (SOAT1) gene or the system for detecting the content or expression of alpha-fetoprotein gene.

The product may be a system; and the system may include reagents and/or instruments. The reagents include chips, preparations, kits or nucleic acid film strip. The kit can be a fluorescent quantitative PCR kit, or an ELISA kit, or an immunohistochemistry kit or others.

Application of the system using acyl-CoA: cholesterol acyltransferase-1 (SOAT1) as a marker in the preparation of products for screening or auxiliary diagnosis of cancer or in the preparation of products for predicting cancer prognosis or in preparation of companion diagnostic products for cancer treatment, also belongs to the protection scope of the present invention.

Application of the system using acyl-CoA: cholesterol acyltransferase-1 (SOAT1) as a marker and the system using it in combination with alpha-fetoprotein as a marker in the preparation of products for screening or auxiliary diagnosis of cancer or in the preparation of products for predicting cancer prognosis or in preparation of companion diagnostic products for cancer treatment, also belongs to the protection scope of the present invention.

In the above application, the product may be a system; and the system may include reagents and/or instruments. The reagents include chips, preparations, kits or nucleic acid film strip. The kit can be a fluorescent quantitative PCR kit, or an ELISA kit, or an immunohistochemistry kit or others.

The application of the system using acyl-CoA: cholesterol acyltransferase-1 (SOAT1) as a marker in the screening or auxiliary diagnosis of cancer or in predicting the prognosis of cancer or in the companion diagnosis of cancer treatment, also belongs to the protection scope of the present invention.

The application of the system using acyl-CoA: cholesterol acyltransferase-1 (SOAT1) as a marker and the system using alpha-fetoprotein as a marker in the screening or auxiliary diagnosis of cancer or in predicting the prognosis of cancer or in the companion diagnosis of cancer treatment, also belongs to the protection scope of the present invention.

In the present invention, the screening or diagnosis target of the product is healthy people or patients with liver cirrhosis (LC) or patients with liver cancer.

The present invention also protects a method for screening or assisting in the diagnosis of cancer or predicting the prognosis of cancer or companion diagnosis for cancer treatment.

The method includes: detecting the content or expression of acyl-CoA: cholesterol acyltransferase-1 (SOAT1) in a sample of a test subject, and diagnosing or assisting in the diagnosis of cancer or predicting the prognosis of cancer based on the content or expression level. Thereinto, the sample includes (but is not limited to) blood, serum, plasma and tissue biopsy.

The present invention also protects another method for screening or assisting in the diagnosis of cancer or predicting the prognosis of cancer or companion diagnosis for cancer treatment.

The method includes: detecting the content or expression of acyl-CoA: cholesterol acyltransferase-1 (SOAT1) and alpha-fetoprotein in a sample of a test subject, and diagnosing or assisting in the diagnosis of cancer or predicting the prognosis of cancer or implementing companion diagnosis for cancer treatment based on the content or expression level.

Thereinto, the sample includes (but is not limited to) blood, serum, plasma and tissue biopsy (such as liver biopsy).

The SOAT1 protein is human SOAT1 protein.

In the above application, product or method, the cancer includes hepatocellular carcinoma, cervical cancer, colon cancer, non-small cell lung cancer, breast cancer, esophageal cancer, leukemia; as an embodiment of the present invention is hepatocellular carcinoma.

Taking hepatocellular carcinoma as an example, experiments have shown that SOAT1 protein can be used as a tumor marker for hepatocellular carcinoma (HCC).

Based on 68 pairs of liver cancer transcriptome data and tissue microarray data of carcinoma and para-carcinoma including 85 liver cancer patients, the expression of SOAT1 transcript and protein abundance in liver cancer was significantly higher than that of adjacent non-tumor tissue. In the serum of patients with liver cancer, the abundance of SOAT1 (mean value 89.11 ng/ml) was significantly higher than that of healthy control group (mean value 12.02 ng/ml) and cirrhosis group (mean value 4.75 ng/ml) (P=0.001). When healthy people were used as the screening object, the threshold for determining HCC patients was serum SOAT1 protein concentration>21.20 ng/ml. At this time, the sensitivity was 65.63% and the specificity was 84.38%. The area under the curve (AUC) of SOAT1 alone as a marker for HCC screening was 0.73, which was close to the AUC (0.74) of AFP alone as a marker for HCC screening. When the two were combined as HCC screening markers, AUC could reach 0.90, indicating that SOAT1 and AFP have good complementarity, and the combined diagnosis of the two could improve the accuracy of HCC screening. When patients with liver cirrhosis were screened, the threshold for determining HCC patients was serum SOAT1 protein concentration>12.69 ng/ml. At this time, the sensitivity was 78.13%, the specificity was 81.82%, and the AUC was 0.76. It shows that SOAT1 can be used as a potential marker for the discriminative diagnosis of patients with hepatocellular carcinoma and liver cirrhosis.

Experiments have also proved that SOAT1 protein can be used as a marker for prognostic evaluation of hepatocellular carcinoma (HCC). SOAT1 is closely related to the poor prognosis of liver cancer. The higher the abundance, the worse the patient's prognosis (P=0.002).

Experiments have also proved that both knockdown of SOAT1 and inhibitor (avasimibe) can significantly inhibit the proliferation and migration of liver cancer cells. In addition, the inhibitory effect on hepatocytes with higher abundance of SOAT1 (PLC/PRF/5) is stronger than that on cell lines with lower abundance of SOAT1 (HepG2), which suggests that targeting SOAT1 can provide a potential accurate treatment for the more malignant liver cancer subtypes screened by SOAT1 as a marker. It shows that SOAT1 being used as a marker for liver cancer screening and prognosis assessment, firstly, patients with higher malignant liver cancers are screened out, and then SOAT1-targeted inhibitors are used for precise treatment. SOAT1 abundance also has the function of screening or assisting in the diagnosis of cancer or predicting the prognosis of cancer or as a companion diagnosis of cancer treatment.

The invention also provides a new use of Avasimibe (CAS registration number is 166518-60-1) shown in formula I.

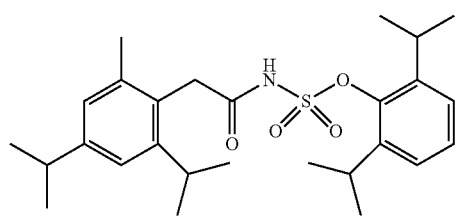

(formula I)

(a) For the preparation of drugs for the prevention and/or treatment of cancer;
(b) For the preparation of drugs for the prevention and/ treatment of cancer spread and metastasis;
(c) For the preparation of drugs that promote the apoptosis of cancer cells;
(d) For the preparation of drugs for inhibiting cancer cell formation;
(e) For the preparation of drugs that inhibit the proliferation and growth of cancer cells in vitro.

The cancer includes hepatocellular carcinoma, cervical cancer, colon cancer, non-small cell lung cancer, breast cancer, esophageal cancer, leukemia; as an embodiment of the present invention is hepatocellular carcinoma.

The cancer cells include liver cancer cells, cervical cancer cells, colon cancer cells, non-small cell lung cancer cells, breast cancer cells, esophageal cancer cells, and leukemia cells; as an embodiment of the present invention, they are liver cancer cells.

The liver cancer cell may specifically be PLC/PRF/5, HepG2, Huh7 or MHCC97H.

The cervical cancer cell may specifically be the Hela cell line, the colon cancer cell may specifically be the HCT116 cell line, the non-small cell lung cancer cell may specifically be the A549 cell line, the breast cancer cell may specifically be the MCF7 cell line, and the esophageal cancer cell may specifically be The ECA109 cell line and the leukemia cell may specifically be the Jurkat cell line.

The present invention also provides a new use of a substance that inhibits acyl-CoA: cholesterol acyltransferase-1 (SOAT1) gene expression and/or protein activity.

The use is selected from at least one of the following:
(a) For the preparation of drugs for the prevention and/or treatment of cancer;
(b) For the preparation of drugs for the prevention and/ treatment of cancer spread and metastasis;
(c) For the preparation of drugs that promote the apoptosis of cancer cells;
(d) For the preparation of drugs for inhibiting cancer cell formation;
(e) For the preparation of drugs that inhibit the proliferation and growth of cancer cells in vitro.

The cancer includes hepatocellular carcinoma, cervical cancer, colon cancer, non-small cell lung cancer, breast cancer, esophageal cancer, leukemia; as an embodiment of the present invention is hepatocellular carcinoma. The cancer cells include liver cancer cells, cervical cancer cells, colon cancer cells, non-small cell lung cancer cells, breast cancer cells, esophageal cancer cells, and leukemia cells; as an embodiment of the present invention, they are liver cancer cells.

The liver cancer cell may specifically be PLC/PRF/5, HepG2, Huh7 or MHCC97H.

The cervical cancer cell may specifically be the Hela cell line, the colon cancer cell may specifically be the HCT116 cell line, the non-small cell lung cancer cell may specifically be the A549 cell line, the breast cancer cell may specifically be the MCF7 cell line, and the esophageal cancer cell may specifically be The ECA109 cell line and the leukemia cell may specifically be the Jurkat cell line.

The inhibitory substance can be an inhibitory substance at the protein level, such as small molecule compounds or antibodies, or an inhibitory substance at the gene level, such as interference RNA, CRSIPR-CAS9 system, homologous recombination DNA fragments, or vectors etc. The small molecule compounds can be specific SOAT1 inhibitor or a non-specific SOAT1 inhibitor.

The SOAT1 inhibitor can be specifically selected from: Avasimibe, whose CAS registration number is 166518-60-1, or Avasimibe derivatives and analogs with the same effect, K604, or K604 derivatives and analogs with the same effect, or compounds that also have the effect of inhibiting acyl-CoA: cholesterol acyltransferase-1.

The structural formula of K604 is shown in formula II, and its English name is
(2-[4-[2-(benzimidazol-2-ylthio)ethyl]piperazin-lyl]-N-[2,4-bis(methylt hio)-6-methyl-3-pyridyl]acetamide.).

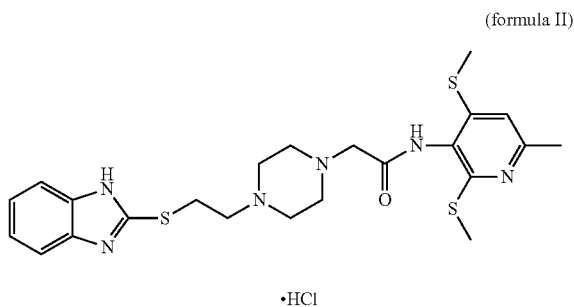 [SMILES: CSc1cc(C)nc(SC)c1NC(=O)CN1CCN(CCSc2nc3ccccc3[nH]2)CC1 ; Cl]

(formula II)

·HCl

The present invention also provides a pharmaceutical composition, which includes a substance that inhibits acyl-CoA: cholesterol acyltransferase-1 (SOAT1) gene expression and/or protein activity as an active ingredient.

The pharmaceutical preparation should match the mode of administration. The pharmaceutical composition of the present invention is preferably prepared in the form of an injection, for example, prepared by a conventional method with physiological saline or an aqueous solution containing glucose and other adjuvants. Pharmaceutical compositions such as injections and solutions should be manufactured under sterile conditions. The dosage of the active ingredient is a therapeutically effective amount, for example, about 1 μg/kg body weight-about 5 mg/kg body weight per day. In addition, it can also be used with other therapeutic agents (such as anti-tumor agents) (including before, during or after use). When the pharmaceutical composition is used, a safe and effective amount of the drug is administered to the mammal, wherein the safe and effective amount is usually at least about 10 μg/kg body weight, and in most cases, does not exceed about 8 mg/kg body weight; preferably, the dose is about 10 μg/kg body weight-about 1 mg/kg body weight. Of course, the specific dosage should also consider factors such as the route of administration, the patient's health status, etc., which are all within the skill range of a skilled physician.

The pharmaceutical composition may also include additional anti-cancer drugs.

The anti-cancer drugs include chemotherapeutics, tumor antibodies, etc.

The anticancer drugs (but not limited to): doxorubicin, vincristine, paclitaxel, cisplatin, carboplatin, 5-FU or a combination thereof.

The administration mode of the pharmaceutical composition is local administration or intra-cancerous administration.

The pharmaceutical composition has at least one of the following effects:

(a) For the prevention and/or treatment of cancer;
(b) For the prevention and/or treatment of cancer spread and metastasis;
(c) Used to promote apoptosis of cancer cells;
(d) Used to inhibit cancer cells from forming cancer;
(e) Used to inhibit the proliferation and growth of cancer cells in vitro.

When necessary, one or more pharmaceutically acceptable carriers can be added to the above-mentioned pharmaceutical composition. The carrier includes conventional diluents, excipients, fillers, binders, wetting agents, disintegrants, absorption promoters, surfactants, adsorption carriers, lubricants, etc. in the pharmaceutical field.

The medicine can be made into injections, suspensions, powders, tablets, granules and other forms. The above-mentioned various dosage forms of drugs can be prepared according to conventional methods in the field of pharmacy.

The present invention also provides a non-therapeutic in vitro method for inhibiting the growth of cancer cells, including:

(I) Culture cancer cells under the condition of adding an inhibitor of acyl-CoA: cholesterol acyltransferase-1, thereby inhibiting the growth of cancer cells;

Or (I') decrease the expression of acyl-CoA: cholesterol acyltransferase-1 gene or decrease the protein amount or protein activity of acyl-CoA: cholesterol acyltransferase-1.

Said cancer cells include liver cancer cells, cervical cancer cells, colon cancer cells, non-small cell lung cancer cells, breast cancer cells, esophageal cancer cells, and leukemia cells, such as liver cancer cells in an embodiment of the present invention.

The present invention also provides a medicine kit for treating cancer. The medicine kit includes the following components:

(a) A first therapeutic agent, which is a substance that inhibits acyl-CoA: cholesterol acyltransferase-1 (SOAT1) gene expression and/or protein activity; In another preferred embodiment, the medicine kit further includes: (b) A second therapeutic agent, the second therapeutic agent is an anti-cancer drug, and the anti-cancer drug contains an active ingredient different from the first therapeutic agent.

The medicine kit provided by the present invention is used for the treatment of cancer, and the cancer includes liver cancer, cervical cancer, colon cancer, non-small cell lung cancer, breast cancer, esophageal cancer, leukemia; more preferably liver cancer. The liver cancer includes metastatic and non-metastatic liver cancer.

The present invention also provides a method for treating cancer, including the steps of: administering a substance that inhibits acyl-CoA: cholesterol acyltransferase-1 (SOAT1) gene expression and/or protein activity or the pharmaceutical composition described in the present invention to a subject in need.

The subject includes mammals, preferably humans.

The inventors have proved through experiments that acyl-CoA: cholesterol acyltransferase-1 (SOAT1) is obviously highly expressed in liver cancer tissues, and its high abundance indicates that patients with liver cancer have a poor prognosis. SOAT1 inhibitors can effectively inhibit the growth of human liver cancer and other tumor cells at the cellular level, and can be used as drug candidates for tumors, especially liver cancer.

It should be understood that, within the scope of the present invention, the above technical features of the present invention and the technical features specifically described in the following (such as the embodiments) can be combined with each other to form a new or preferred technical solution. Due to space limitations, they are not elaborated one by one here.

DESCRIPTION OF THE DRAWINGS

FIG. 1A, based on 68 pairs of liver tumor tissue and adjacent non-tumor tissue transcriptome data and tissue microarray data (including 95 HCC and 85 para-carcinoma samples) (FIG. 1B), it was found that the expression of SOAT1 transcript and protein in liver cancer was significantly higher than the expression level of its paired non-tumor tissue (FIG. 1B, 1C). FIG. 1D, survival analysis of patients with high SOAT1 and low SOAT1 expression in tissue microarray. The results showed that the overall survival of patients with high SOAT1 protein expression was significantly lower than that of patients with low SOAT1 expression. Unpaired Mann-Whitney test (FIG. 1A, 1C), log-rank test (FIG. 1D). *P<0.05, P<0.01, *P<0.001

FIG. 2 shows the determination of cholesteryl ester content in 25 pairs of liver cancer and corresponding adjacent tissues based on mass spectrometry. FIG. 2B, the expression difference of cholesteryl esters (6 types), the catalytic product of SOAT1, in human liver tumor tissue (T) and adjacent non-tumor tissues (NT). The results showed that the amount of cholesteryl ester, the catalytic product of SOAT1, in HCC was significantly higher than that in paired adjacent tissues, which helped prove that the expression of its catalytic enzyme SOAT1 in liver cancer was significantly higher than that in paired adjacent tissues.

FIG. 4B, the expression of SOAT1 in PLC cells was higher than that in HepG2 cells. FIG. 4C, SOAT1 specific knockdown could significantly inhibit the proliferation (FIG. 4C,4D) and migration (FIG. 4E,4F) of liver cancer cells, and the inhibitory effect on PLC cells (FIG. 4C,E) with higher SOAT1 abundance was significantly higher than on HepG2 cells (FIG. 4D,4F). Unpaired Mann-Whitney test (FIG. 4C-F), *P<0.05, P<0.01, *P<0.001

FIG. 5A shows that the IC50 values of Avasimibe for PLC/PRF/5, HepG2, Huh7 and MHCC97H were 6.9, 11.6, 6.8 and 25.2 μM, respectively, which could significantly inhibit the proliferation of liver cancer cell lines. FIG. 5B, Avasimibe could significantly reduce the migration of PLC/PRF/5 and HepG2 liver cancer cell lines. It suggested that patients with higher malignant liver cancer screened by SOAT1 could target SOAT1 for precise treatment. Unpaired Mann-Whitney test (FIG. 5B). *P<0.05, P<0.01, *P<0.001.

EMBODIMENTS

Figure 1A:
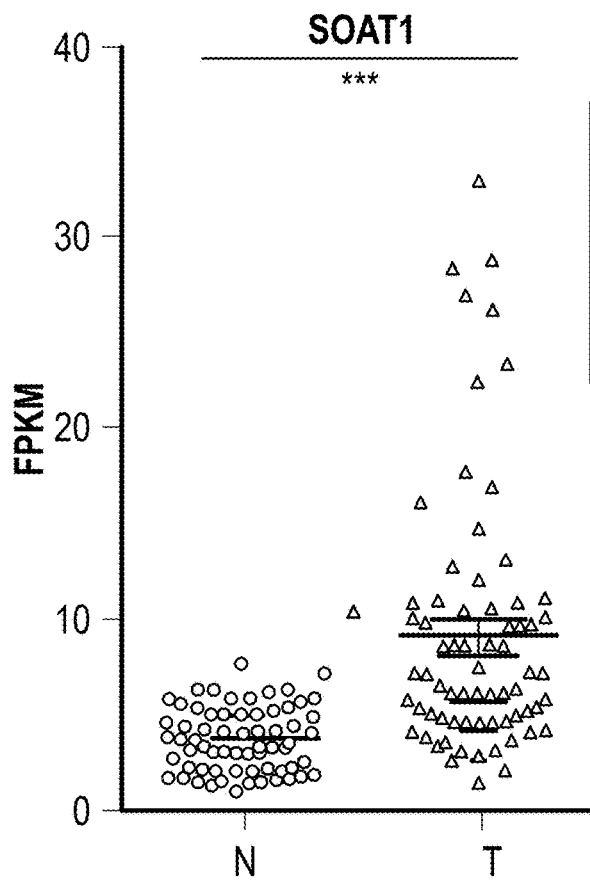
FIGS. 1A-1D. The expression of SOAT1 was closely related to the occurrence and prognosis of liver cancer.

After extensive and in-depth research, the inventors found for the first time that inhibiting the activity of the SOAT1 protein can effectively inhibit the growth of cancer cells (especially liver cancer cells) at the cellular and animal levels. The present invention has been completed on this basis.

Terms in the present invention:

SOAT1

As used herein, the terms "SOAT1", "SOAT1 protein" or "acyl-CoA: cholesterol acyltransferase-1 protein" can be used interchangeably. Inhibiting the activity of SOAT1 can effectively inhibit the growth of liver cancer at the cellular and animal levels. SOAT1 can be used as a potential drug target for the treatment of cancer (such as liver cancer, advanced liver cancer).

Those of ordinary skill in the art can use conventional methods to regulate the expression of SOAT1 protein, reduce the expression of SOAT1 gene or inactivate SOAT1 gene expression (interruption inactivation, knockout, homologous recombination, interfering RNA, etc.).

Methods to reduce SOAT1 protein expression and activity include (but are not limited to): adding SOAT1 specific inhibitors.

SOAT1 inhibitor

As used herein, the terms "SOAT1 inhibitor", "SOAT1 specific inhibitor", and "acyl-CoA: cholesterol acyltransferase-1 inhibitor" can be used interchangeably, and all refer to compounds that have inhibitory effects on acyl-CoA: cholesterol acyltransferase-1, for example, Avasimibe, whose CAS registration number is 166518-60-1, or Avasimibe derivatives and analogs with the same effect, K604, or K604 derivatives and analogs with the same effect, or compounds that also have the effect of inhibiting acyl-CoA: cholesterol acyltransferase-1.

The present invention will be further explained below in conjunction with specific embodiments. It should be understood that these embodiments are only used to illustrate the present invention and not to limit the scope of the present invention.

The experimental methods without specific conditions in the following examples usually follow conventional conditions such as conditions described in Molecular Cloning: A Laboratory Manual (New York: Cold Spring Harbor Laboratory Press, 1989), or the conditions recommended by the manufacturer.

Materials and Methods

Reagents:

SOAT1 antibody (ABN66) was purchased from Merck Millipore;

Rabbit secondary antibody (CW0103S) was purchased from Beijing Kangwei Shi Ji Biotechnology Co., Ltd. (cwbiotech);

SOAT1 inhibitor Avasimibe was purchased from Sigma; The SOAT1 specific inhibitor K604 was synthesized by Beijing Shikang Synthesis Pharmaceutical Technology Co., Ltd. (Reference: Lkenoya M., Yoshinaka Y., Kobayashi H., et al. A selective ACAT-1 inhibitor, K-604, suppresses fatty streak lesions in fat-fed hamsters without affecting plasma cholesterol levels [J]. Atherosclerosis, 2007, 191(2): 290-297.);

Liver cancer tissue chip (HLiv-HCC180Sur-05): 95 cases of hepatocellular carcinoma in survival period: 95 cases of carcinoma/85 cases of para-carcinoma. The operation time was from 2006.8 to Nov. 2009, and the follow-up time was 2010.9. Followed up for 4-7 years. Purchased from Shanghai Outdo Biotech Co., Ltd.;

SOAT1 ELISA reagent (MBS9304160) was purchased from Mybiosource;

Cholesterol ester standard (CE 18:1) were purchased from Sigma;

Cell culture medium (DMEM) and fetal bovine serum were purchased from Invitrogen;

Cell lines and tissue samples:

PLC/PRF/5, HepG2, Huh7 were purchased from Xiehe Cell Bank (Cell Center, Institute of Basic Medicine, Peking Union Medical College);

MHCC97H was purchased from the Liver Cancer Institute of Zhongshan Hospital, Fudan University;

Hela, HCT116, A549, MCF7, ECA109, Jurkat cell lines were purchased from Cell Resource Center, Shanghai Institutes for Biological Sciences, Chinese Academy of Sciences;

The liver carcinoma and para-carcinoma tissues used for cholesteryl ester determination were provided by Shanghai Zhongshan Hospital and were taken from liver cancer patients undergoing surgical treatment. All patients signed an informed consent statement.

The 75 serum samples used for serum ELISA were all from Shanghai Zhongshan Hospital. Among them, 32 were liver cancer serum samples, 32 were normal human serum samples for physical examination, and 11 were liver cirrhosis serum samples. All study subjects were fasted for more than 8 hours before blood draw, and about 5 ml of fasting venous blood was collected, and it was centrifuged at 3000 r/min for 10 minutes after standing at room temperature for 30 minutes. Serum was collected and frozen at −20° C. for SOAT1 concentration monitoring.

Method:

1. 68 pairs of liver carcinoma and para-carcinoma transcriptome data

Total RNA was extracted from liver tissue samples using TRIzol kit. Magnetic beads with Oligo (dT) were used to enrich mRNA. Added Fragmentation Buffer to the obtained mRNA to make the fragments into short fragments, and then use the fragmented mRNA as a template, synthesized the first strand of cDNA with random hexamers, and added buffer, dNTPs, RNase H and DNA polymerase I to synthesize the second strand of cDNA. Purified with QiaQuick PCR kit and eluted with EB buffer. After end repair, adding base A, adding sequencing adapters, and then recovering the target size fragments by agarose gel electrophoresis, and performing PCR amplification, the entire library preparation work was completed. The constructed library was sequenced with Illumina HiSeq2500. Novogene Company was responsible for the whole experiment process and producing data.

2. Detection of SOAT1 expression differences in 95 cases of HCC and 85 cases of para-carcinoma samples by immunohistochemistry:

1) Baking tissue array: Put the tissue array in an oven, adjusted the temperature to 63° C., and baked the wax for one hour.

2) Dewaxing: After the tissue array was baked, took it out of the oven and put it in the automatic dyeing machine for dewaxing; the dewaxing process was as follows:

Two cylinders of xylene, 15 minutes per cylinder (set time by instrument);

Two cylinders of absolute ethanol, 7 minutes per cylinder (set time by instrument);

1 cylinder of 90% alcohol, 5 minutes (set time by instrument);

1 cylinder of 80% alcohol, 5 minutes (set time by instrument);

3) 1 cylinder of 70% alcohol, 5 minutes (set time by instrument);

4) Antigen retrieval: Took out the tissue array from the staining machine and rinsed it with pure water 3 times, each time not less than 1 minute. During the flushing process, put the citric acid repair solution or EDTA repair solution on the induction cooker to start heating;

5) Blocking: Used a commercial ready-to-use blocking agent, dropped the blocking agent to the tissue array, and counted for 10-15 minutes.

6) Adding the SOAT1 primary antibody (which was SOAT1 antibody) at 1:2000: took out the tissue array, rinsed with PBS buffer 3 times, 1 minute per time; Took the primary antibody out of the refrigerator and put it in a centrifuge at 7200 rpm for no less than 30 seconds; Took out the primary antibody, diluted it with antibody diluent at 1:2000, and incubated at room temperature for 30 minutes;

7) Adding rabbit secondary antibody: rinsed the tissue array 3 times with PBS buffer, 1 minute each time; added dropwise the ready-to-use working solution of the secondary antibody, incubated at room temperature for 30 minutes; after the time was up, rinsed with PBS 3 times, not less than 1 minute each time.

8) DAB color development: Took out the DAB kit from the refrigerator and prepared it according to 1 ml DAB diluent+1 drop of DAB chromogen; Added the diluted DAB dropwise to the tissue array, observed the color development intensity, the longest color development could be 5 minutes, and rinsed with tap water for 5 minutes after the time was up.

Hematoxylin counterstaining and mounting: Added Hastelloy Hematoxylin (SIGMA) dropwise to the tissue array for 1 minute, then immersed it in 0.25% hydrochloric acid alcohol for not less than 2 seconds, rinsed with tap water for more than 2 minutes, and mounted the tissue array after drying at room temperature.

3. Detection of the content of cholesteryl esters in 25 pairs of liver carcinoma and para-carcinoma tissues based on ESI-MS 1) Sample processing: tissue non-polar lipid metabolome pre-processing: weighed about 100 mg tissue, homogenized, added 1 ml chloroform:methanol=3:1 (v/v), and ultrasonically extracted for 1 h. Centrifuged at 13200 r/min at 4° C. for 10 min, took 200 ul of the lower layer of chloroform, centrifuged and froze, concentrated and dried. Reconstituted with 400 ul of isopropanol and acetonitrile mixture (1:1, v/v), loaded sample and tested.

2) Chromatographic separation: Reversed phase chromatography was used to analyze tissue samples by U3000 fast liquid chromatography from Thermo Scientific. Column: waters UPLC CSH C18 (1.7 um 2.1 mm*100 mm); mobile phase: A (acetonitrile/water 4:6, 0.1% formic acid, 10 mM ammonium acetate) and B (acetonitrile/isopropanol 9:1, v/v, 0.1% formic acid, 10 mM ammonium acetate); Flow rate: 0.3 ml/min; Injection volume is 1.0 μL;
Column temperature: 45° C.

3) Quadrupole orbital ion trap mass spectrometer equipped with Thermo electrospray ion source (Q Exactive™) was used for mass spectrometric analysis. The positive and negative ion source voltages were 3.7 kv and 3.5 kV, respectively. The capillary heating temperature was 320° C. The air pressure was 30 psi and the auxiliary air pressure was 10 psi. The volumetric heating evaporation temperature was 300° C. Both the lift gas and the auxiliary gas were nitrogen. The collision gas was nitrogen and the pressure was 1.5 mTorr. The first-level full scan parameters were: resolution 70,000, automatic gain control target 1×106, maximum isolation time 50 ms, and mass-to-charge ratio scan range 150-1500. The mass axis calibration of the mass spectrometer adopted the external standard method, and the mass error was 5 ppm. Calibration quality positive ion selected 74.09643, 83.06037, 195.08465, 262.63612, 524.26496 and 1022.00341. Negative ions were 91.00368, 96.96010, 112.98559, 265.14790, 514.28440 and 1080.00999. Metabolite identification adopted dd-MS2 scan mode (data dependent scan mode). The specific parameters were: the resolution was 17500, the automatic gain control target was 1×105, the maximum isolation time was 50 ms, maximum 10 ions scanning secondary fragments, and dynamic elimination. Mass separation window 2, collision energy 30 v and intensity 1×105. The liquid mass system was controlled by Xcalibur 2.2 SP1.48 software, and data acquisition and targeted metabolite quantitative processing were all operated by this software.

4) Metabolomics data processing: The Progenesis QI software was used for processing, importing raw data, peak alignment, peak extraction, and normalization processing, and finally a table with time, mass-to-charge ratio and peak intensity retained was formed. The peak extraction time of reversed-phase chromatography and hydrophilic chromatography were 0.5 to 19 and 0.5 to 9 minutes, respectively. The intensity of peak extraction was limited to mode 5. Various additive ions such as hydrogenation and sodium addition were de-convolved to each ion feature. Metabolite identification adopted the human metabolome database and lipid database for primary molecular weight matching. In order to evaluate the stability and repeatability of the system during sample collection, we used quality control samples.

Quality control samples were obtained after all samples were pipetted by a fixed volume and mixed uniformly. The pretreatment method of quality control samples was the same as other samples. In order to obtain reliable and reproducible metabolites, this experiment first used 5 blank samples to equilibrate the chromatographic column, and then used 3 quality control samples to equilibrate the column conditions. Then inserted a quality control sample every 6-8 samples to monitor the stability and repeatability of the entire liquid-mass system. At the same time, the coefficient of variation of the metabolic characteristics extracted from the quality control sample was calculated, and the metabolic characteristics with a coefficient of variation of more than 15% were deleted. In this experiment, the CE 18:1 standard was used as an external standard to evaluate the absolute concentration of cholesterol ester in the sample.

4.Detection of the concentration of SOAT1 in serum by enzyme-linked immunosorbent assay (ELISA)

Detected the concentration of SOAT1 in serum by enzyme-linked immunosorbent assay (ELISA). Set up 3 replicates for each group of serum samples, used the multifunction microplate reader to detect the OD value, and used the average of the 3 replicates as the final OD value of the sample. The expression levels of SOAT1 were compared between the liver cancer group and the normal group and the liver cirrhosis group.
5.Detection of AFP concentration in serum Used the Roche automatic electrochemiluminescence immunoanalyzer, used the AFP chemiluminescence kit for detection, and referred to the instrument manual for detailed steps.
6.SOAT1 knocking down

```
Knockdown vector: pLKO.1-TRC; sequence of shRNA:
                                          (SEQ ID NO. 1)
5'-CCGGTGGTCCATGACTGGCTATATTCTCGAGAATATAGCCAGTCATG GACCATTtTTTG-3'.
```

1) On the first day, inoculated PLC/PRF/5 or HepG2 cells in a 6-well plate.

2) On the second day, the cell fusion degree was about 40-50%, and 200 μl/well of SOAT1-sh or SOAT1-control lentivirus was added for virus infection.

3) On the third day, virus-infected PLC/PRF/5 or HepG2 cells were screened by adding puromycin to a final concentration of 2 μg/ml.

4) On the sixth day, a part of the cells were collected according to the conventional method for CCK8 experiment, and part of the lysed protein was tested by Western bolt.
7. CCK8 experiment 1) On the first day, after routine trypsinization and counting of cells in a 60 mm culture dish, 5000 cells/well, inoculated 4 96-well plates.

2) On the second day, after about 24 hours of culture, the cell growth was in the logarithmic phase. Replaced with a new culture medium added with different concentrations of SOAT1 inhibitor, 100 μl/well, set 10 μM, 20 μM concentration group and control group respectively, the control group was 1% DMSO, each group had 3 repetitive wells. Took a 96-well plate and added 10% CCK8, 100 μl/well, and measured the OD value at 0 hour at 450 nm wavelength after 1 hour. Cell-free well was a blank background.

3) On the third day, added 10% CCK8 to a 96-well plate, and measured the OD value at 24 hours at 450 nm wavelength after 1 hour.

4) On the fourth day, added 10% CCK8 to a 96-well plate, and measured the OD value at 48 hours at 450 nm wavelength after 1 hour.

5) On the fifth day, added 10% CCK8 to a 96-well plate, and measured the OD value at 72 hours at 450 nm wavelength after 1 hour.

6) Summarized the OD values at all time points and drew growth curves. 8. Cell migration experiment
The First Day:
(1) Starving cells: Withdrew the whole medium, washed twice with PBS, and replaced with serum-free DMEM.
(2) Added 2.5% serum of DMEM to the transwell lower chamber, 600 ul/well. Equilibrated overnight in a 37° C. incubator. Thetranswell chamber was 3422 of Company Corning.
The Second Day:
(3) Added trypsin to digest the hungry cells from yesterday (about 30-50 seconds at room temperature), quickly and carefully sucked up the trypsin, added 1 ml of complete medium, and collected in a 1.5 ml centrifuge tube;

(4) Centrifuged at 800 rpm for 4 min; discarded the supernatant, added serum-free DMEM, and washed once; centrifuged again for 4 min at 800 rpm; discarded the supernatant and added 0.5% FBS in DMEM;

(5) Cell counting, adjusted the cell concentration with 0.5% DMEM containing Avsimibe, about 400,000 cells/ml, Avasimibe concentration 10 μM; the control group did not contain Avasimibe, and the rest were the same. 100 μl/well was added to the tanswell upper chamber.

The third day (20-24 hours later):

(6) Discarded the culture medium;
(7) Fixed with anhydrous methanol for 20 minutes;
(8) Air-dried the film;
(9) Pinched the cotton of the cotton swab to flat and rotated it to clean the upper chamber cells. Wrapped the tweezers with a cotton ball to gently wipe off the edge cells.
(10) 0.5% crystal violet staining;
(11) Rinsed slowly with clean water;
(12) Observed and took pictures under an inverted microscope.

9. Western blot detection was done by conventional methods.

10. Statistical analysis

All analyses were done using GraphPad Prism®, a program offered by GraphPad Software, LLC, that combines scientific graphing, comprehensive curve fitting (nonlinear regression), statistics, and data organization for performing basic statistical operations commonly used by laboratory and clinical researchers. $P<0.05$ was considered as significant difference.

Figure 1B:
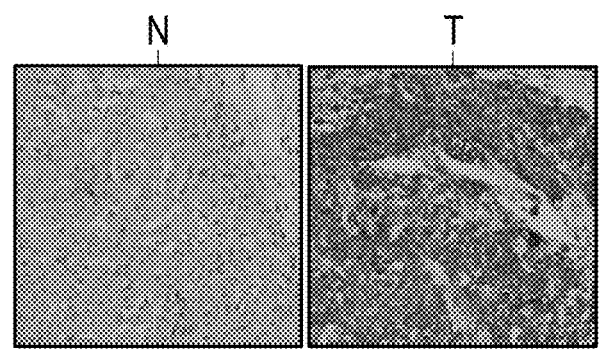
Figure 1C:
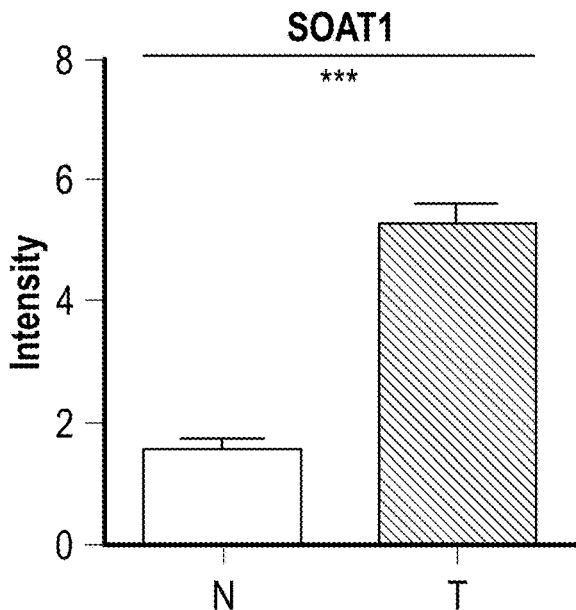
Figure 1D:
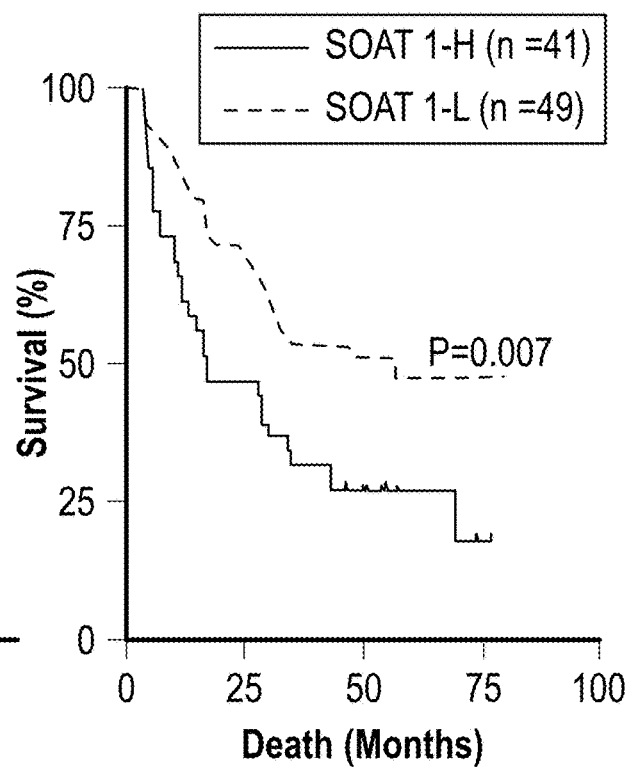

Example 1. The high expression of SOAT1 in liver cancer was closely related to the occurrence and prognosis of liver cancer In order to confirm the high expression of SOAT1 in liver cancer, the inventors compared transcriptome data of 68 pairs of liver carcinoma and paired para-carcinoma (FIG. 1A) and carcinoma and para-carcinoma data of tissue microarray (including 95 HCC and 85 para-carcinoma samples) (FIGS. 1B, 1C), and SOAT1 was found to be highly expressed in HCC. The overall survival of patients with high SOAT1 expression was significantly lower than that of patients with low SOAT1 expression (FIG. 1D)

Figure 2A:
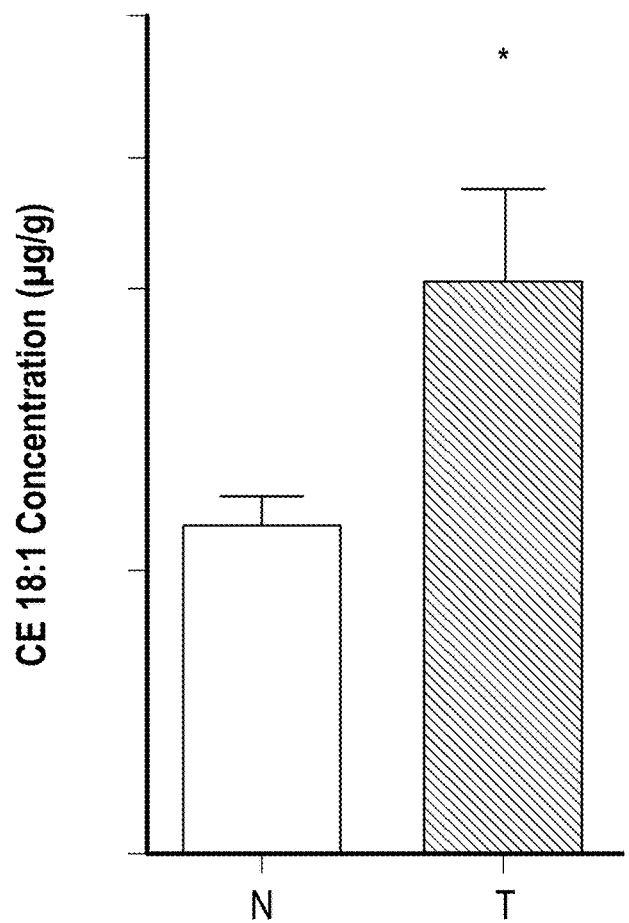
FIGS. 2A and 2B, the concentration of the main catalytic substrate of SOAT1 CE 18:1 in the cell in HCC was significantly higher than that in the paired adjacent tissues. The unpaired Mann-Whitney test was used. *P<0.05.
Figure 2B:
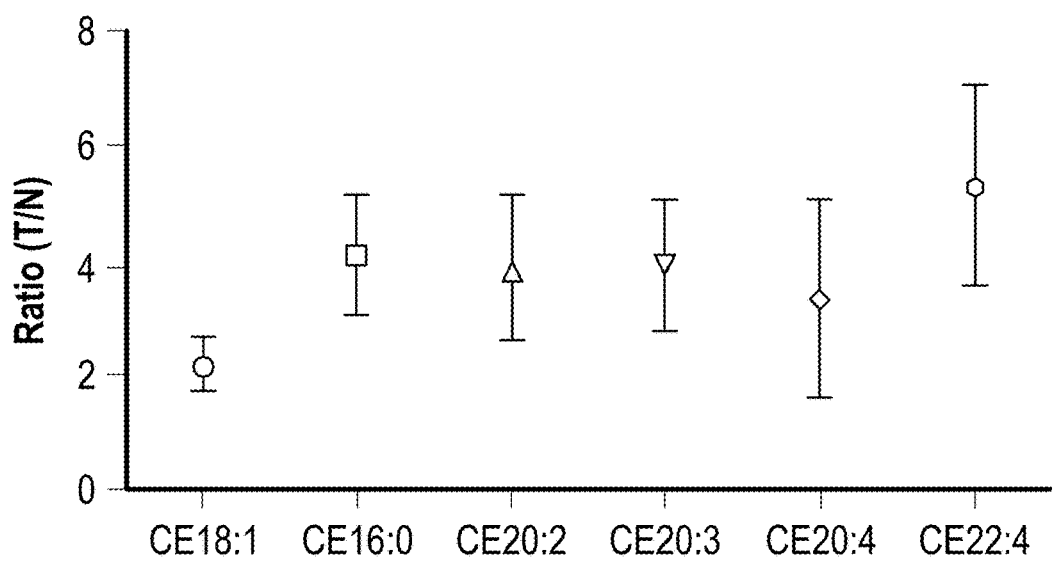

Example 2. Cholesterol ester, the catalytic product of SOAT1, was obviously highly expressed in human liver cancer tissues In order to confirm the high expression of SOAT1 in liver cancer, the inventors used mass spectrometry to determine the cholesteryl ester content of SOAT1 catalytic product in 25 pairs of liver cancer and corresponding adjacent tissues. The results showed that the concentration of cholesteryl ester standard (CE 18:1), the main catalytic substrate of SOAT1 in cells, was significantly higher in HCC than in matched adjacent tissues (FIG. 2A); The expression difference of cholesteryl esters (6 types), the catalytic product of SOAT1, in human liver cancer (T) and adjacent tissues (NT) (FIG. 2B), further proved that the expression of its catalytic enzyme SOAT1 in liver cancer was significantly higher than that in the paired paracancerous tissues.

Example 3. SOAT1 significantly increased in liver cancer serum samples

In order to confirm the high expression of SOAT1 in liver cancer, the inventors used human serum samples to detect the expression of SOAT1 in different populations based on an ELISA kit (FIG. 3).

Figure 3A:
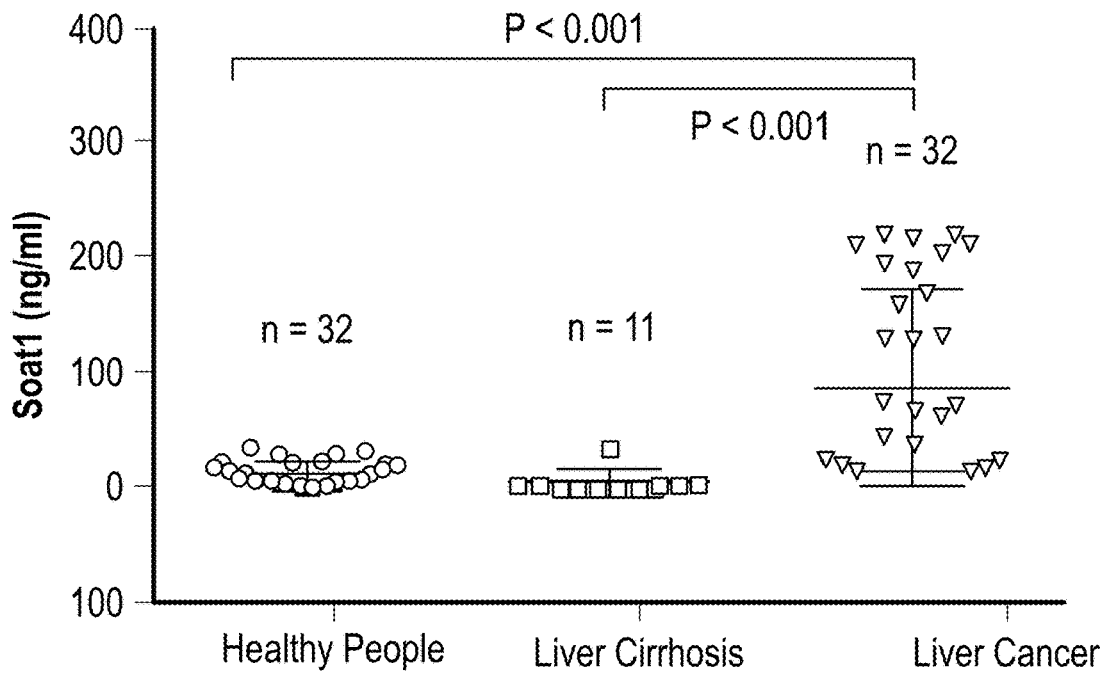
FIGS. 3A-3C, the expression of SOAT1 in the serum of healthy people, liver cirrhosis and liver cancer patients was determined based on the ELISA kit. The results showed that SOAT1 was significantly elevated in the serum of patients with liver cancer (FIG. 3A). It showed that SOAT1 could be used as a diagnostic marker for screening liver cancer from healthy people and cirrhotic people. ROC curve analysis of serum SOAT1 protein levels between HCC and healthy people (FIG. 3B) and liver cirrhosis people (FIG. 3C) showed that SOAT1 can be used as potential markers for screening liver cancer from healthy people (AUC=0.77) and people with liver cirrhosis (AUC=0.73). After being used in combination with AFP, the AUC for screening liver cancer from healthy people and people with liver cirrhosis could reach 0.92 and 0.90 respectively, indicating that SOAT1 and AFP had good complementarity and could be combined for liver cancer screening.

ELISA test results of SOAT1 protein expression level in serum samples of normal group, liver cirrhosis patient group and liver cancer patient group: the average concentration of SOAT1 protein in the normal group was 12.02 ng/ml, the liver cirrhosis patient group was 4.75 ng/ml, the liver cancer patient group was 89.11 ng/ml. Through statistical analysis of SOAT1 protein content in each group of samples (unpaired Mann-Whitney test), it was found that serum SOAT1 protein was significantly different between the normal group and the liver cancer patient group ($p<0.001$), as well as the liver cirrhosis patient group and the liver cancer patient group ($p<0.001$) (FIG. 3A). It was suggested that SOAT1 can be used as a diagnostic marker for screening liver cancer from healthy people and cirrhotic people.

Figure 3B:
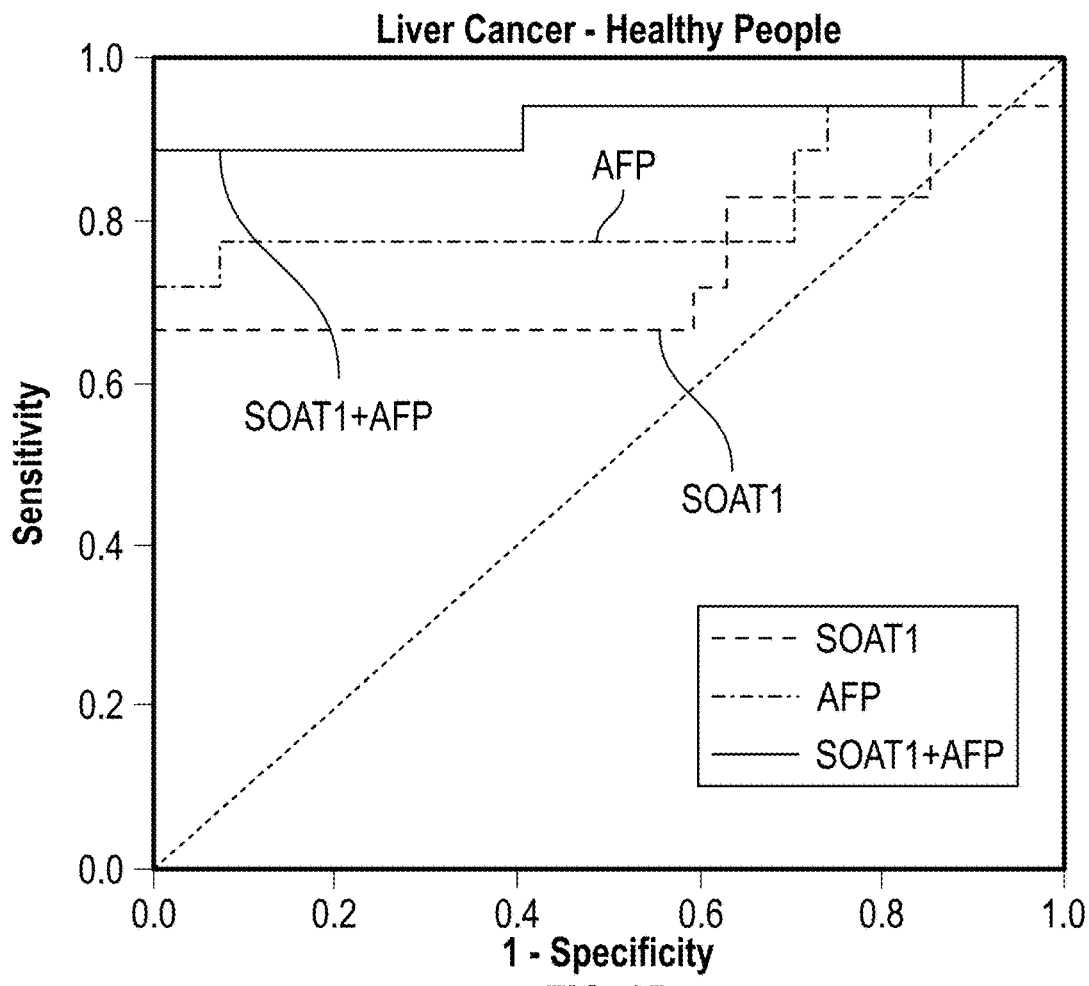

With the normal group as the control group and the liver cancer group as the disease group, ROC curve analysis was performed on the serum SOAT1 protein level (as shown in FIG. 3B), the area under the curve was AUC=0.77, the sensitivity was 66.7%, and the specificity was 100%.

Figure 3C:
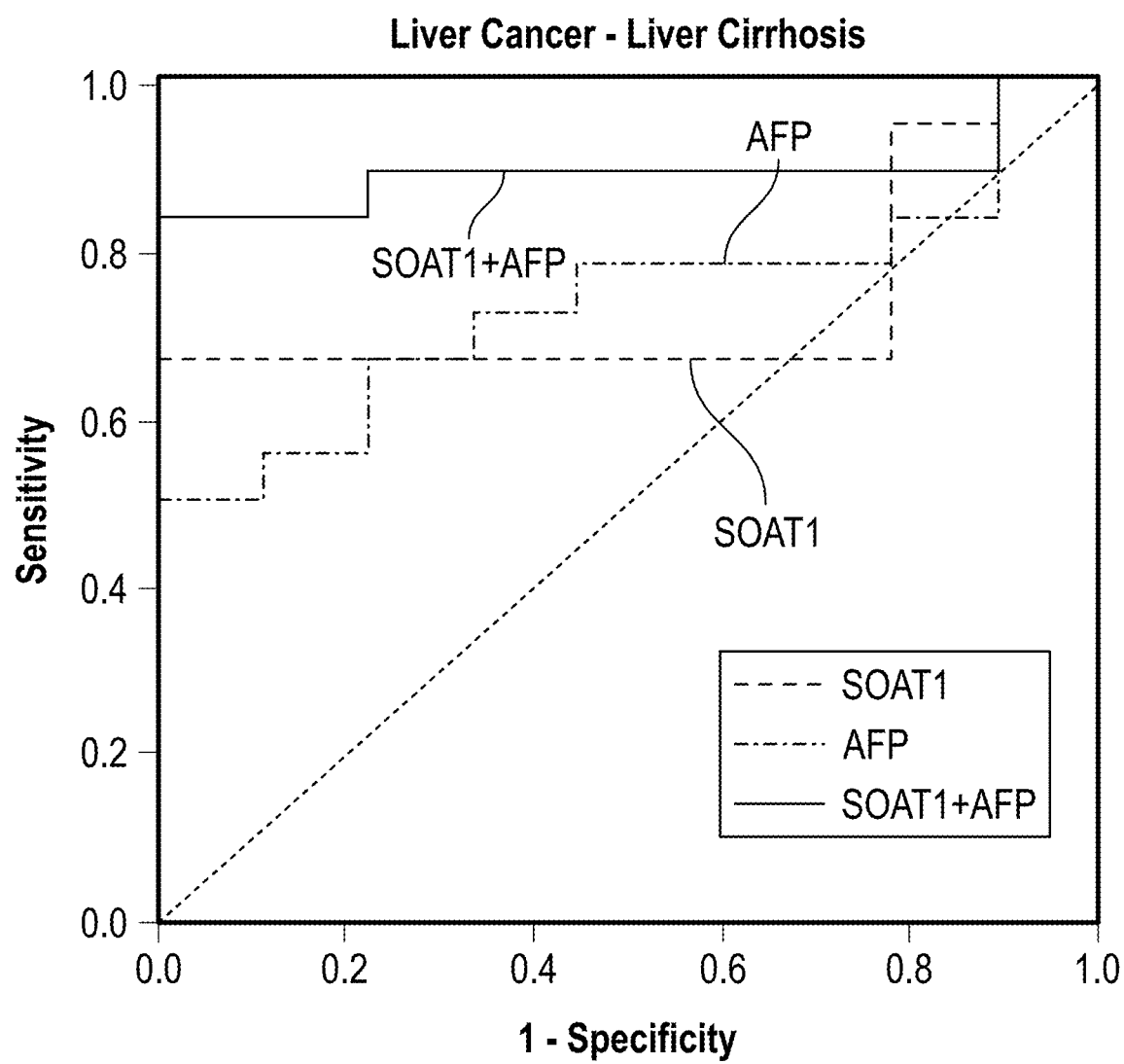

With liver cirrhosis patients as the control group and liver cancer patients as the disease group, ROC curve analysis was performed on the serum SOAT1 protein level (as shown in FIG. 3C). The area under the curve was AUC=0.73, the sensitivity was 66.7%, and the specificity was 100%. The results indicated that SOAT1 can be used as a potential marker for screening liver cancer from healthy and cirrhotic people.

When performing a discriminative diagnosis between a normal person and a HCC patient, if the SOAT1 protein concentration in the serum of the person to be tested is greater than 37.4 ng/ml (Table 1, the concentration was the concentration value corresponding to the maximum Youden index.

The sensitivity was 66.7% and the specificity was 100%), the person to be tested is or candidate of a HCC patient.

In the discriminative diagnosis of patients with liver cirrhosis and HCC, if the SOAT1 protein concentration in the serum of the person to be tested is greater than 28.7 ng/ml (Table 2, the concentration was the concentration value corresponding to the maximum Youden index. The sensitivity was 66.7% and the specificity was 81.82%), the person to be tested is or candidate of a HCC patient.

The concentration thresholds for the above two discriminative diagnoses are the thresholds corresponding to the maximum Yorden index of the ROC curve. The Yorden index and corresponding thresholds for the discriminative diagnosis of normal people/cirrhosis patients and HCC patients are shown in Table 1 and Table 2 (The maximum Yorden index and the corresponding threshold are marked in bold).

TABLE 1

Threshold, sensitivity, specificity and Youden index with the normal group as the control group

| Threshold (ng/ml) | Sensitivity | 1-specificity | Youden index |
| --- | --- | --- | --- |
| 0.1 | 100.0% | 100.0% | 0.00 |
| 0.1 | 100.0% | 96.3% | 0.04 |
| 0.4 | 100.0% | 92.6% | 0.07 |
| 1.0 | 100.0% | 88.9% | 0.11 |
| 1.2 | 94.4% | 88.9% | 0.06 |
| 1.3 | 94.4% | 85.2% | 0.09 |
| 1.6 | 94.4% | 81.5% | 0.13 |
| 2.3 | 94.4% | 77.8% | 0.17 |
| 2.9 | 94.4% | 74.1% | 0.20 |
| 3.2 | 88.9% | 74.1% | 0.15 |

TABLE 1-continued

Threshold, sensitivity, specificity and Youden index
with the normal group as the control group

| Threshold (ng/ml) | Sensitivity | 1-specificity | Youden index |
|---|---|---|---|
| 3.6 | 88.9% | 70.4% | 0.19 |
| 4.0 | 83.3% | 70.4% | 0.13 |
| 4.3 | 83.3% | 66.7% | 0.17 |
| 4.5 | 83.3% | 63.0% | 0.20 |
| 4.7 | 77.8% | 63.0% | 0.15 |
| 4.9 | 72.2% | 63.0% | 0.09 |
| 5.3 | 72.2% | 59.3% | 0.13 |
| 6.3 | 66.7% | 59.3% | 0.07 |
| 8.1 | 66.7% | 55.6% | 0.11 |
| 9.2 | 66.7% | 51.9% | 0.15 |
| 9.4 | 66.7% | 48.1% | 0.19 |
| 9.9 | 66.7% | 44.4% | 0.22 |
| 10.4 | 66.7% | 40.7% | 0.26 |
| 12.1 | 66.7% | 37.0% | 0.30 |
| 14.1 | 66.7% | 29.6% | 0.37 |
| 16.0 | 66.7% | 25.9% | 0.41 |
| 18.4 | 66.7% | 22.2% | 0.44 |
| 20.2 | 66.7% | 18.5% | 0.48 |
| 22.1 | 66.7% | 14.8% | 0.52 |
| 25.4 | 66.7% | 11.1% | 0.56 |
| 27.8 | 66.7% | 7.4% | 0.59 |
| 30.5 | 66.7% | 3.7% | 0.63 |
| 37.4 | 66.7% | 0.0% | 0.67 |
| 51.2 | 61.1% | 0.0% | 0.61 |
| 67.4 | 55.6% | 0.0% | 0.56 |
| 101.0 | 44.4% | 0.0% | 0.44 |
| 128.4 | 38.9% | 0.0% | 0.39 |
| 129.9 | 33.3% | 0.0% | 0.33 |
| 159.3 | 27.8% | 0.0% | 0.28 |
| 190.6 | 22.2% | 0.0% | 0.22 |
| 201.2 | 16.7% | 0.0% | 0.17 |
| 213.3 | 11.1% | 0.0% | 0.11 |
| 218.3 | 5.6% | 0.0% | 0.06 |
| 219.8 | 0.0% | 0.0% | 0.00 |

TABLE 2

Threshold, sensitivity, specificity and Youden index
with the cirrhosis group as the control group

| Threshold (ng/ml) | Sensitivity | 1-specificity | Youden index |
|---|---|---|---|
| 1.1 | 100.0% | 88.9% | 0.111 |
| 2.1 | 94.4% | 88.9% | 0.056 |
| 3.1 | 88.9% | 88.9% | 0.000 |
| 3.4 | 88.9% | 77.8% | 0.111 |
| 4.2 | 83.3% | 77.8% | 0.056 |
| 4.7 | 77.8% | 77.8% | 0.000 |
| 5.1 | 72.2% | 77.8% | '−0.05 |
| 6.9 | 66.7% | 77.8% | '−0.11 |
| 8.6 | 66.7% | 66.7% | 0.000 |
| 9.0 | 66.7% | 55.6% | 0.111 |
| 9.7 | 66.7% | 44.4% | 0.222 |
| 10.2 | 66.7% | 33.3% | 0.333 |
| 11.5 | 66.7% | 22.2% | 0.444 |
| 14.3 | 66.7% | 11.1% | 0.556 |
| 28.7 | 66.7% | 0.0% | 0.667 |
| 51.2 | 61.1% | 0.0% | 0.611 |
| 65.2 | 55.6% | 0.0% | 0.556 |
| 71.8 | 50.0% | 0.0% | 0.500 |
| 101.0 | 44.4% | 0.0% | 0.444 |
| 128.4 | 38.9% | 0.0% | 0.389 |
| 129.9 | 33.3% | 0.0% | 0.333 |
| 159.3 | 27.8% | 0.0% | 0.278 |
| 190.6 | 22.2% | 0.0% | 0.222 |
| 201.2 | 16.7% | 0.0% | 0.167 |
| 213.3 | 11.1% | 0.0% | 0.111 |
| 218.3 | 5.6% | 0.0% | 0.056 |
| 219.8 | 0.0% | 0.0% | 0.000 |

Example 4. Application of SOAT1 protein and AFP protein in detecting HCC patients The serum concentration of AFP protein in the normal group was less than 20 ng/ml, the cirrhosis patient group was 6.34 ng/ml, and the HCC patient group was 375.5 ng/ml. ELISA test results of SOAT1 protein concentration in serum samples of normal group, LC patient group, and HCC patient group: The average concentration of SOAT1 protein in the normal group was 12.02 ng/ml, the cirrhosis patient group was 4.75 ng/ml, and the liver cancer patient group was 89.11 ng/ml. Through statistical analysis of the SOAT1 protein and AFP protein concentration in each group of samples (unpaired Mann-Whitney test), it was found that serum SOAT1 protein and AFP protein concentrations were significantly different between the normal group and the HCC patient group ($P<0.001$), as well as the liver cirrhosis patient group and the HCC patient group ($P<0.001$).

The standard for jointly judging SOAT1 protein and AFP protein was based on the calculation result of binary logistic regression. The specific calculation formula for distinguishing HCC from normal group was: $P = 1/(1+e-(-4.585+0.407*AFP+0.082*SOAT1))$, when P is greater than 0.57, then it is judged as HCC. The calculation formula to distinguish HCC from LC is: $P=1/(1+e-(-1.945+0.077*AFP+0.068*SOAT1))$, when P is greater than 0.67, then it is judged as HCC.

SPSS 19.0 software was used to analyze the ROC curve of normal people (N) and hepatocellular carcinoma (HCC) patients, liver cirrhosis (LC) and hepatocellular carcinoma (HCC) patients respectively with the combined use of AFP and SOAT1 to diagnose HCC.

Taking the normal group as the control group and the HCC patient group as the disease group, the serum SOAT1 protein and AFP protein were used jointly to discriminate the area under the curve for diagnosis of HCC patients; AUC=0.92 (as shown in FIG. 3B), the sensitivity was 88.9%, and the specificity was 100%. Taking the LC patient group as the control group and the HCC patient group as the disease group (as shown in FIG. 3C), both were used jointly to discriminate the AUC for diagnosis of HCC patients; AUC=0.90, sensitivity was 83.3%, specificity was 100%.

It can be seen from the above results that SOAT1 protein and AFP protein in serum can be used as potential markers for discriminant diagnosis of normal people and HCC patients, as well as LC and HCC patients.

The above results were summarized in Table 3 and Table 4, showing the effect of SOAT1 protein, AFP protein and their combined application in the discriminant diagnosis of hepatocellular carcinoma patients and normal people or LC patients.

TABLE 3

Comparison of the effects of SOAT1 protein and AFP
protein in the diagnosis of normal persons and
hepatocellular carcinoma patients(SOAT1 or SOAT1
combined with AFP was more effective than AFP)

| Diagnostic protein | Sensitivity | Specificity | AUC |
|---|---|---|---|
| SOAT1 | 66.7% | 100% | 0.77 |
| AFP | 55.6% | 100% | 0.81 |
| SOAT1 + AFP | 88.9% | 100% | 0.92 |

TABLE 4

Comparison of the effects of SOAT1 protein and AFP protein in the diagnosis of patients with liver cirrhosis and hepatocellular carcinoma (SOAT1 or SOAT1 combined with AFP was more effective than AFP)

| Diagnostic protein | Sensitivity | Specificity | AUC |
|---|---|---|---|
| SOAT1 | 66.7% | 100% | 0.73 |
| AFP | 50% | 88.9% | 0.74 |
| SOAT1 + AFP | 83.3% | 100% | 0.90 |

It can be seen from the above results that SOAT1 and AFP have good complementarity and can be combined for liver cancer screening.

Figure 4C:
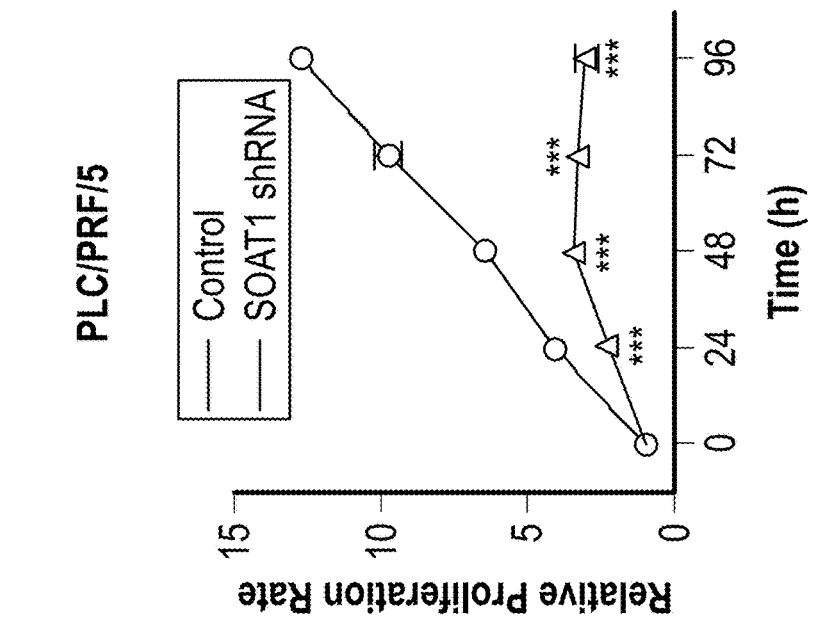
FIGS. 4A-4F shows that SOAT1 specific knockdown could significantly inhibit the proliferation and migration of liver cancer cells. The results showed that SOAT1shRNA only knocked down SOAT1 specifically, and had no effect on the abundance of SOAT2 (FIG. 4A).
Figure 4B:
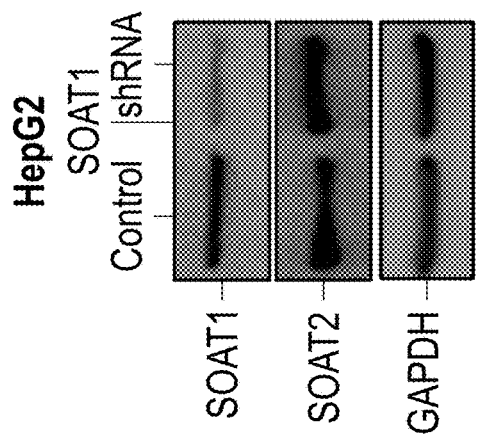
Figure 4A:
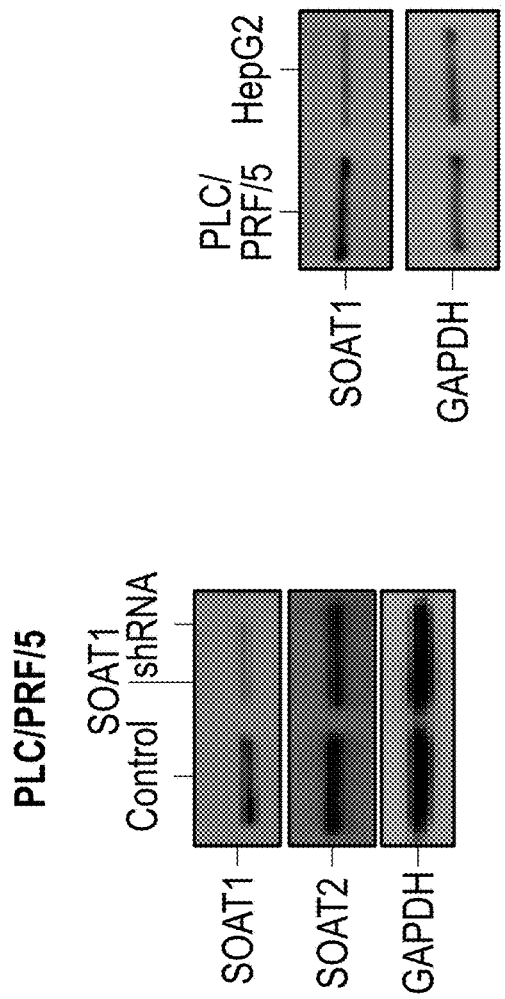
Figure 4F:
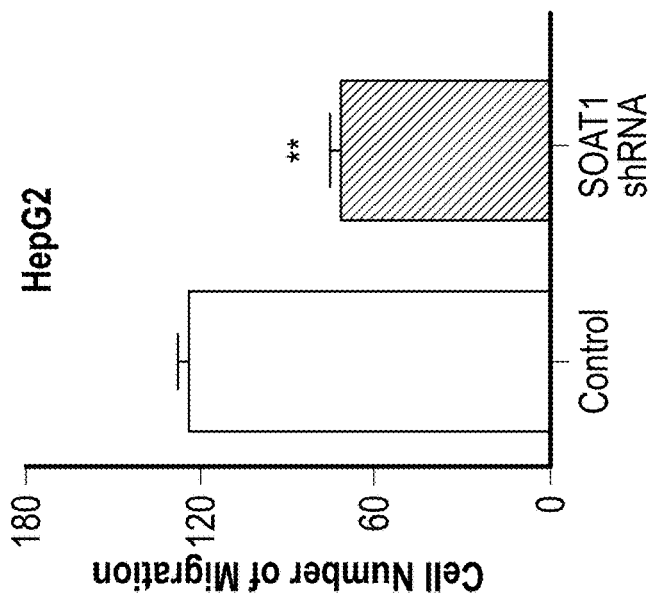
Figure 4E:
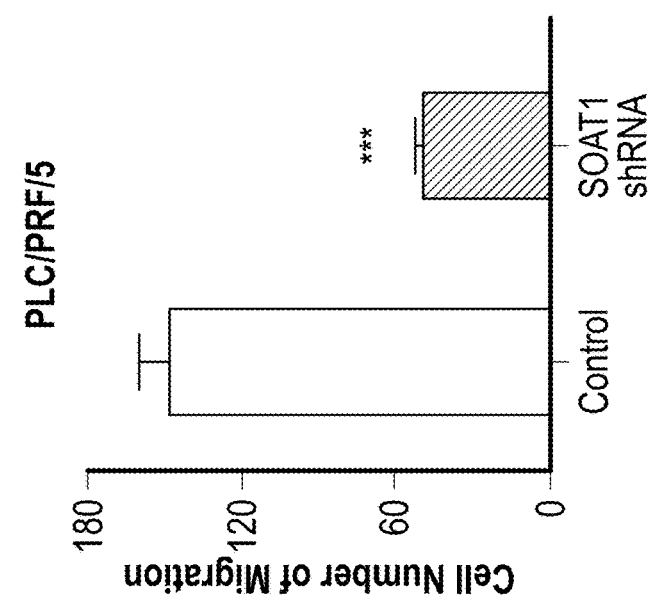
Figure 4D:
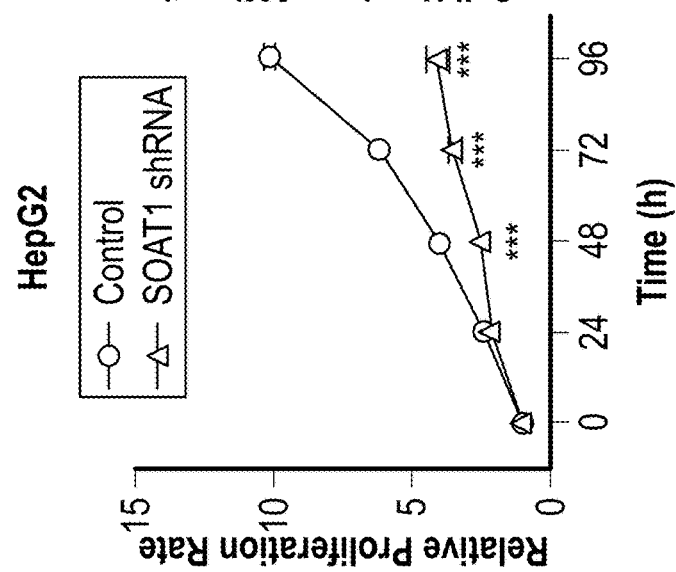

Example 5. SOAT1 knockdown can inhibit the proliferation and migration of liver cancer cells In this example, the inventors studied the inhibitory effect of SOAT1 specific knockdown on the proliferation and migration of liver cancer cells. The results showed that SOAT1shRNA only knocked down SOAT1 specifically, and had no effect on the abundance of SOAT2 (FIG. 4A). SOAT1 specific knockdown could significantly inhibit the proliferation (FIG. 4C, 4D) and migration (FIG. 4E, 4F) of liver cancer cells, suggesting that SOAT1 may be a target for the treatment of liver cancer.

Figure 5A:
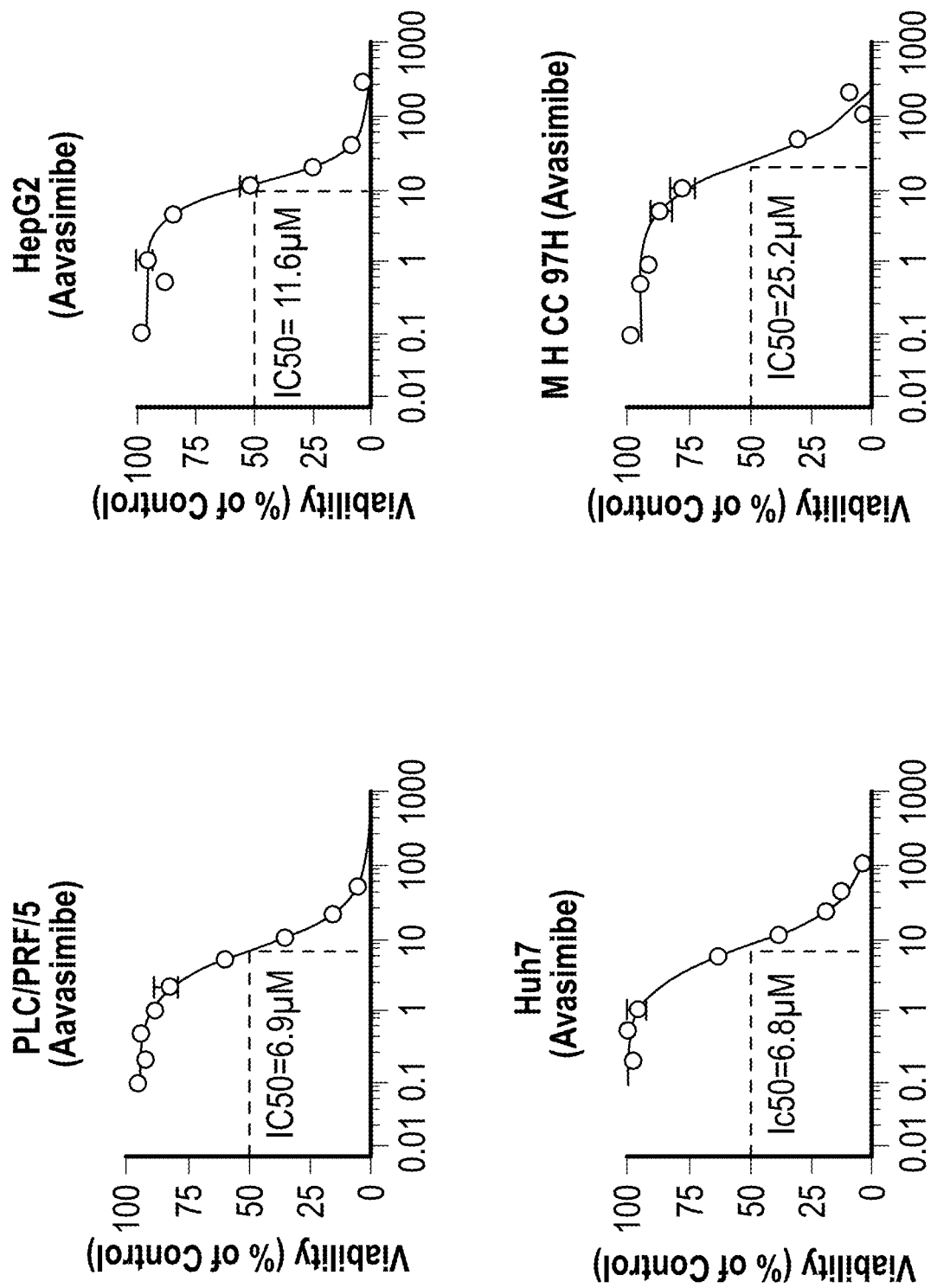
FIGS. 5A and 5B shows the effect of SOAT1 inhibitor Avasimibe on the proliferation and migration of liver cancer cell lines.
Figure 5B:
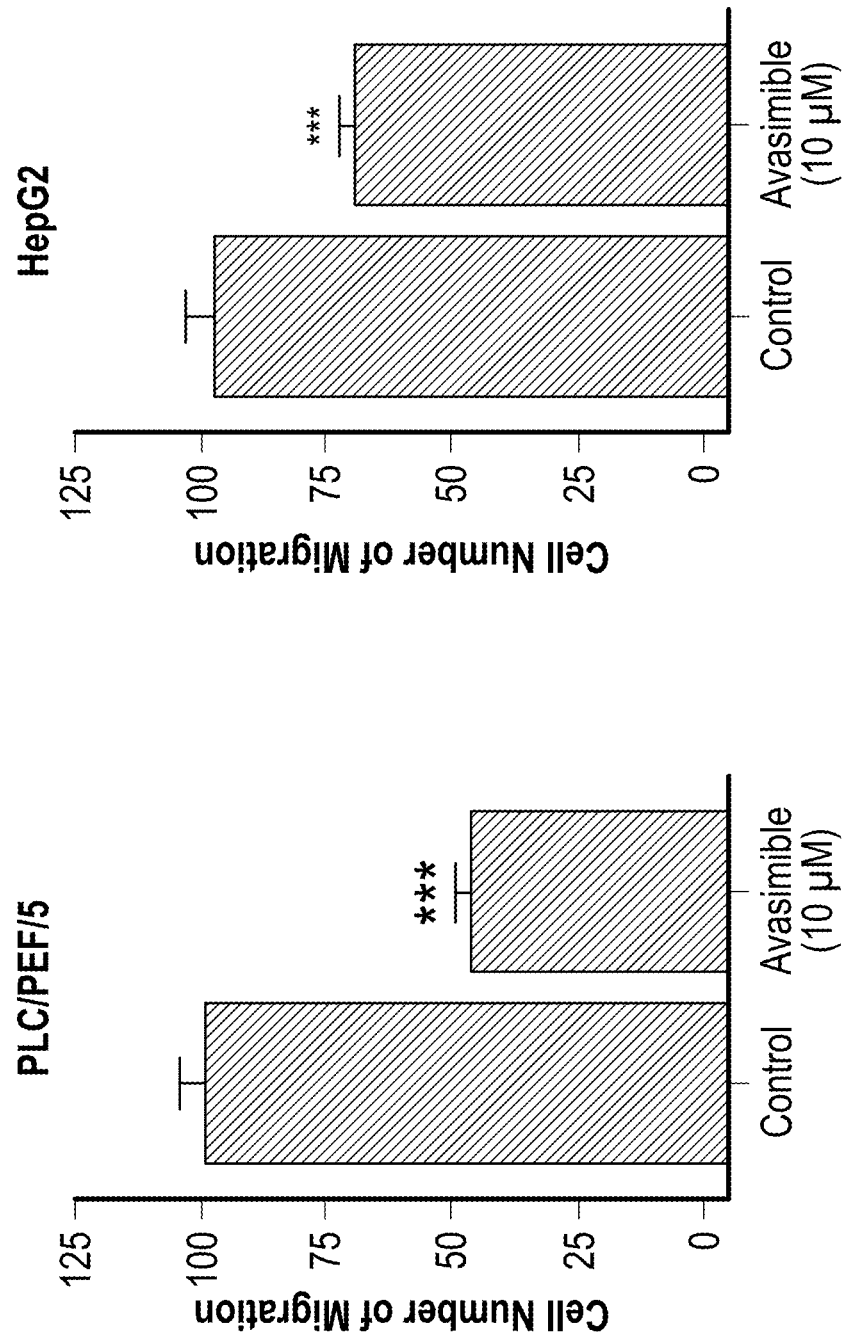

Example 6. SOAT1 inhibitor Avasimibe can inhibit the growth of liver cancer cells In this example, the inventors studied the role of SOAT1 inhibitors in inhibiting the growth of liver cancer cells. The results showed that Avasimibe, a non-specific SOAT1 inhibitor, can significantly inhibit the proliferation (FIG. 5A) and migration (FIG. 5B) of liver cancer cells (PLC/PRF/5, HepG2, Huh7 and MHCC97H). It suggested that patients with higher malignant liver cancer screened by SOAT1 could target SOAT1 for precise treatment.

Example 7. SOAT1 inhibitor K604 can inhibit the growth of liver cancer cells

Figure 6:
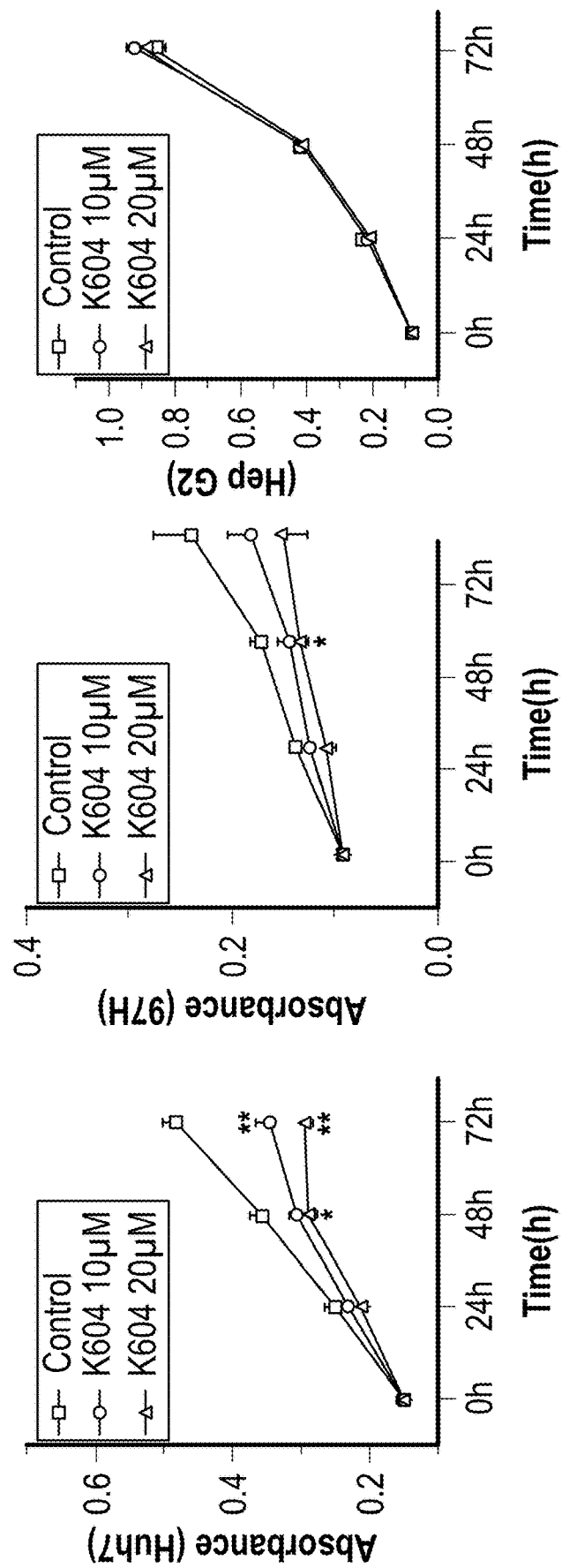
FIG. 6 shows the effect of SOAT1 specific inhibitor K604 on the proliferation of Huh7, MHCC97H and HepG2 hepatocarcinoma cell lines. K604 significantly inhibited the proliferation of liver cancer cells (Huh7 and MHCC97H). *P<0.05, **P<0.01.

In this example, the inventors studied the role of the SOAT1 inhibitor K604 in inhibiting the growth of liver cancer cells. The results showed that K604, a specific inhibitor of SOAT1, could significantly inhibit the proliferation of liver cancer cells (Huh7 and MHCC97H) (FIG. 6).

Example 8. SOAT1 inhibitor Avasimibe can inhibit the growth of cancer cells

In this example, the inventors studied the role of SOAT1 inhibitors in the growth of common cancer cells.

Figure 7:
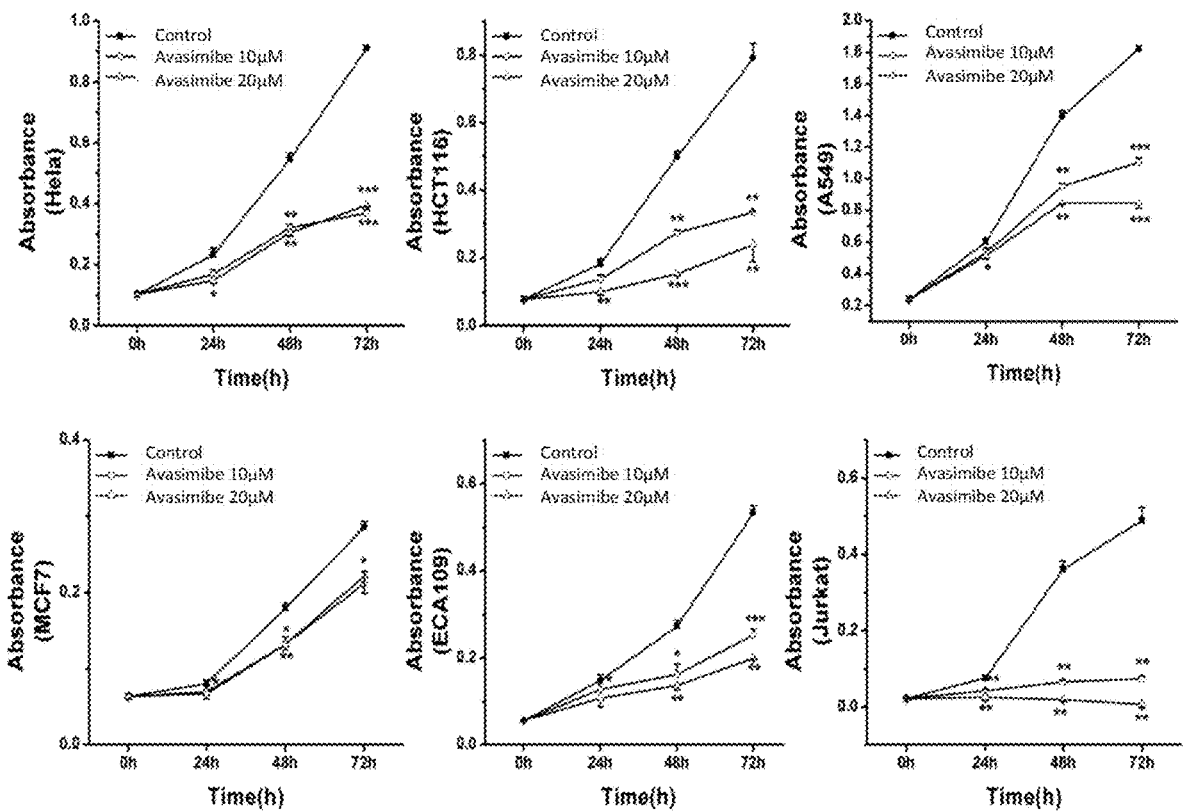
FIG. 7 shows the effect of SOAT inhibitor Avasimibe on the proliferation and migration of other tumor cell lines. The SOAT inhibitor Avasimibe significantly inhibited the proliferation of tumor cells (Cervical cancer Hela cell line, colon cancer HCT116 cell line, non-small cell lung cancer A549 cell line, breast cancer MCF7 cell line, esophageal cancer ECA109 cell line and leukemia Jurkat cell line). *P<0.05, P<0.01, *P<0.001.

The results showed that the SOAT1 inhibitor Avasimibe significantly inhibited the proliferation of common cancer cell lines (cervical cancer Hela cell line, colon cancer HCT116 cell line, non-small cell lung cancer A549 cell line, breast cancer MCF7 cell line, esophageal cancer ECA109 cell line and leukemia Jurkat cell line) (FIG. 7). It showed that Avasimibe could significantly inhibit the proliferation of cancer cell lines and might be used as a drug for cancer treatment.

Figure 8:
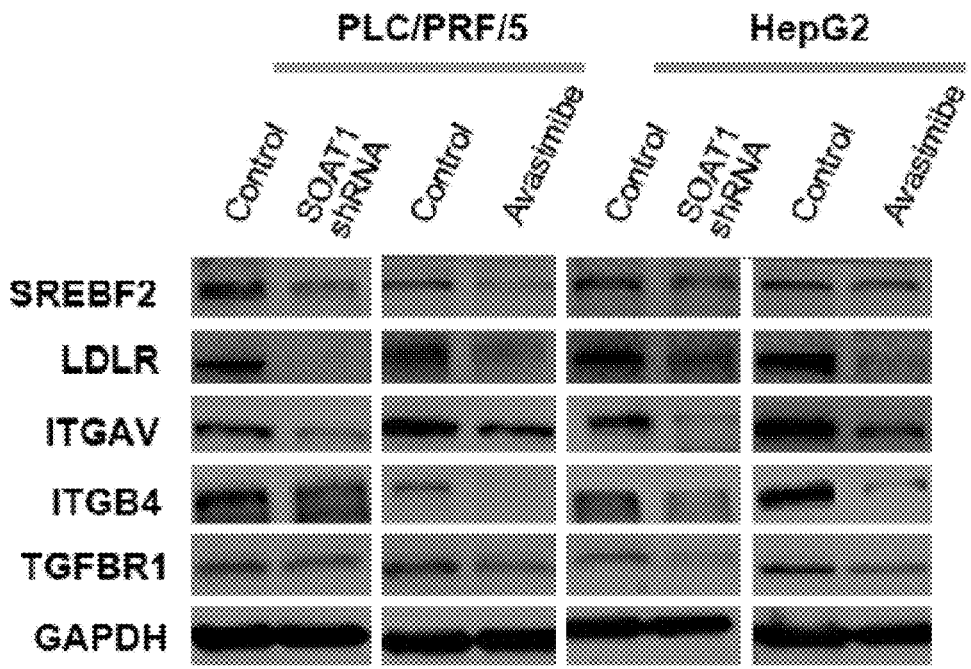
FIG. 8 shows that SOAT1 knockdown and inhibitors can significantly reduce the expression of the transcription factor SREBF2 responsible for cholesterol regulation, extracellular uptake receptor (LDLR) and some receptor molecules on the surface of the plasma membrane that are known to be associated with tumor invasion, such as integrins (ITGAV, ITGB4) and TGFBR1.

Example 9. Mechanisms of SOAT1 knockdown and Avasimibe treatment in inhibiting the occurrence and development of liver cancer SOAT1 knockdown and inhibitor (Avasimibe) could significantly inhibit the expression of the transcription factor SREBF2 responsible for cholesterol regulation, extracellular uptake receptor (LDLR) and some receptor molecules on the surface of the plasma membrane that are known to be associated with tumor invasion, such as integrins (ITGAV, ITGB4) and TGFBR1 (FIG. 8).

Although the embodiments of the present invention have been shown and described above, it can be understood that the above embodiments are exemplary and should not be construed as limiting the present invention. Those of ordinary skill in the art can make changes, modifications, substitutions and modifications to the above-mentioned embodiments within the scope of the present invention.

INDUSTRIAL APPLICATION

The inventors have proved through experiments that acyl-CoA: cholesterol acyltransferase-1 (SOAT1) is obviously highly expressed in liver cancer tissues, and its high abundance indicates that patients with liver cancer have a poor prognosis. SOAT1 inhibitors can effectively inhibit the growth of human liver cancer and other tumor cells at the cellular level, and can be used as drug candidates for tumors, especially liver cancer.

The invention claimed is:

1. A method of diagnosing liver cancer, comprising:
   detecting a protein level of acyl-CoA: cholesterol acyltransferase-1 (SOAT1) in a sample from a test subject; and
   diagnosing liver cancer in the test subject based on the protein level of SOAT1 gene; and
   treating the diagnosed test subject with an inhibitory agent that
      inhibits SOAT1 gene expression,
      inhibits protein level of SOAT1, or
   inhibits protein activity of SOAT1,
   wherein the inhibitory agent is an interference RNA, the interference RNA is an shRNA encoded by a DNA with a sequence of SEQ ID NO: 1;

the sample being selected from the group consisting of blood, liver carcinoma, and liver-adjacent non-tumor tissue.

2. The method according to claim 1, wherein the method further comprises the steps of:
detecting a protein level of alpha-fetoprotein (AFP) in the sample from the test subject; and
diagnosing liver cancer in the test subject, based on the protein levels of SOAT1 and AFP detected in the sample from the test subject.

3. The method according to claim 2, wherein the method of detecting the protein level of SOAT1 comprises:
contacting the sample from the test subject with a capture reagent, wherein a first portion of the capture reagent is bound to the SOAT1 and a second portion of the capture reagent remains unbound;
removing the unbound capture reagent; and
detecting an amount of bound capture reagent, thereby providing an indication of the protein level of SOAT1 in the sample from the subject.

4. The method according to claim 3, wherein: the method of detecting the protein level of SOAT1 comprises:
contacting, in vitro, the sample from the test subject with the capture reagent, thereby forming a complex between the capture reagent and the SOAT1 in the sample, wherein the capture reagent comprises a detectable label;
separating the complex formed during the contacting step from a residual portion of the capture reagent not incorporated into the complex;
determining the protein level of SOAT1 by detecting a signal proportional to an amount of SOAT1 in the sample; and
quantifying a signal from the detectable label of the capture reagent comprising the complex formed in said step of contacting, the signal being proportional to an amount of SOAT1 in the sample of the test subject, whereby a concentration of SOAT1 within the sample of the test subject is based on the quantified signal calculated.

5. The method according to claim 3, wherein: the capture reagent is an antibody or fragment thereof having specific binding affinity or an aptamer.

6. The method according to claim 2, wherein: the gene expression levels are detected using an assay selected from the group consisting of Polymerase Chain Reaction, Real-Time Polymerase Chain Reaction, direct DNA expression in microarray, Sanger sequencing analysis, Northern blot, direct RNA expression detection serial analysis of gene expression, and next-generation RNA-sequencing.

7. The method according to claim 6, wherein the method for assaying gene expression levels comprises:
extracting RNA from the sample; and
converting the RNA to cDNA.

8. The method according to claim 1, wherein:
comparing the concentration value of SOAT1 within the sample of the test subject to a reference concentration of SOAT1 when diagnosing liver cancer patient from healthy people,
providing a diagnosis of liver cancer in the test subject when the concentration value of the SOAT1 is greater than the reference concentration of SOAT1.

9. The method according to claim 2, wherein:
comparing the concentration value of SOAT1 and AFP within the sample of the test subject to a reference concentration of SOAT1 and AFP when diagnosing liver cancer patient from healthy people, providing a diagnosis of liver cancer in the test subject when the concentration value of the SOAT1 and AFP is each greater than the reference concentration of SOAT1 and AFP.

10. The method according to claim 8, wherein the reference concentration value was the concentration value corresponding to the maximum Youden index from Receiver Operating Characteristic (ROC) analysis.

11. The method according to claim 10, wherein:
the reference concentration is 37.4 ng/ml, when screening or diagnosing liver cancer patient from healthy people;
the reference concentration is 28.7 ng/ml, when screening or diagnosing liver cancer patient from cirrhotic people.

12. The method according to claim 2, wherein:
a calculation formula for diagnosing liver cancer patient from healthy people is:

$$P=1/(1+e-^{(-4.585+0.407*AFP+0.082*SOAT1)}),$$

and, when P is greater than 0.57, then the diagnosis is positive for liver cancer; and
a calculation formula for diagnosing liver cancer patient from cirrhotic people is:

$$P=1/(1+e-^{(-1.945+0.077*AFP+0.068*SOAT1)})$$

and, when P is greater than 0.67, then the diagnosis is positive for liver cancer.

13. A method of diagnosing liver cancer, comprising:
detecting gene expression level of a SOAT1 gene in a sample from a test subject, the sample being selected from the group consisting of blood, liver carcinoma, and liver-adjacent non-tumor tissue,
diagnosing liver cancer based on a gene expression level of the SOAT1 gene; and
treating the diagnosed subject with an inhibitory agent that inhibits the SOAT1 gene expression, inhibits protein level of SOAT1, and/or inhibits protein activity of SOAT1,
wherein the inhibitory agent is an interference RNA, wherein the interference RNA is an shRNA encoded by DNA with a sequence of SEQ ID NO: 1.

14. The method according to claim 13, further comprising the steps of:
detecting the gene expression level of AFP in the sample from the test subject; and
diagnosing liver cancer, based on the gene expression level of SOAT1 and AFP.

15. The method according to claim 13, wherein
the gene expression levels are detected using an assay selected from the group consisting of Polymerase Chain Reaction, Real-Time Polymerase Chain Reaction, direct DNA expression in microarray, Sanger sequencing analysis, Northern blot, direct RNA expression detection serial analysis of gene expression, and next-generation RNA-sequencing.

16. The method according to claim 13, wherein the method for assaying gene expression levels comprises:
extracting RNA from the sample; and
converting the RNA to cDNA.

17. The method according to claim 13, further comprising the steps of:
comparing the gene expression level of the SOAT1 gene within the sample of the test subject to a reference gene expression level of the SOAT1 gene when diagnosing liver cancer patient from healthy people; and providing a diagnosis of liver cancer in the test subject when the gene expression level of the SOAT1 gene is higher than the reference gene expression level of the SOAT1 gene.

18. The method according to claim 14, further comprising the steps of:

comparing the gene expression levels of SOAT1 and AFP within the sample of the test subject to reference gene expression levels of SOAT1 and AFP when diagnosing liver cancer patient from healthy people; and providing a diagnosis of liver cancer in the test subject when the gene expression levels of the SOAT1 and AFP are each greater than the reference gene expression levels of SOAT1 and AFP.

* * * * *